United States Patent [19]

McCabe et al.

[11] 4,043,129

[45] Aug. 23, 1977

[54] HIGH TEMPERATURE GEOTHERMAL ENERGY SYSTEM

[75] Inventors: Barkman C. McCabe, Los Angeles; Edward Zajac, Hollywood, both of Calif.

[73] Assignee: Magma Energy, Inc., Los Angeles, Calif.

[21] Appl. No.: 683,506

[22] Filed: May 5, 1976

[51] Int. Cl.² .................................... F03G 7/04
[52] U.S. Cl. .................................... 60/641; 166/314; 417/53; 417/379; 417/423 R
[58] Field of Search .................... 166/314; 60/641; 407/379, 53, 423; 165/45

[56] References Cited

U.S. PATENT DOCUMENTS 3,910,050  10/1975  Matthews et al. .................... 60/641

Primary Examiner—Allen M. Ostrager
Attorney, Agent, or Firm—Albert L. Gabriel

[57] ABSTRACT

Method and apparatus for controlling a well providing access to an underground source of high temperature geothermal brine against flashing as the hot brine is delivered upwardly through the well to surface power apparatus for use of heat from the brine in the generation of electrical power, thereby eliminating plugging of the well by precipitated mineral deposits as well as other problems which have heretofore caused most geothermal resources of this character to be beset with operational problems. A pump down in the well pressurizes the hot output liquid that is delivered to the surface generating equipment against flashing, the pump having a novel long tailpipe suspended therefrom which extends deep into the well. Liquid that is substantially cooler than the high temperature brine, and which may be output liquid from the power apparatus or may be provided from another cooler geothermal source, is injected into the well from the surface to form a continuously downflowing column about the outside of the pump and tailpipe assembly, and the tailpipe is sufficiently long so that the weight of the column of injected liquid applies sufficient pressure against the high temperature brine proximate the lower end of the tailpipe to prevent flashing of the brine. The cooler injection liquid is mixed with the high temperature brine proximate the tailpipe to produce hot output liquid of intermediate temperature, enabling the pump to operate at a low enough temperature, and under a low enough pressure head, to come within the capability of present pump technology and to minimize the pumping power and length of the pumping string required. The invention also includes novel concrete ditch reinjection conduit means for precipitating out minerals from highly concentrated brine that may be used for generating power, while delivering the brine to a reinjection well for return to the underground geothermal system, thereby preventing such mineral precipitation from occurring in a reinjection pipeline or in the reinjection well and eliminating pipeline and/or reinjection well clogging.

90 Claims, 6 Drawing Figures

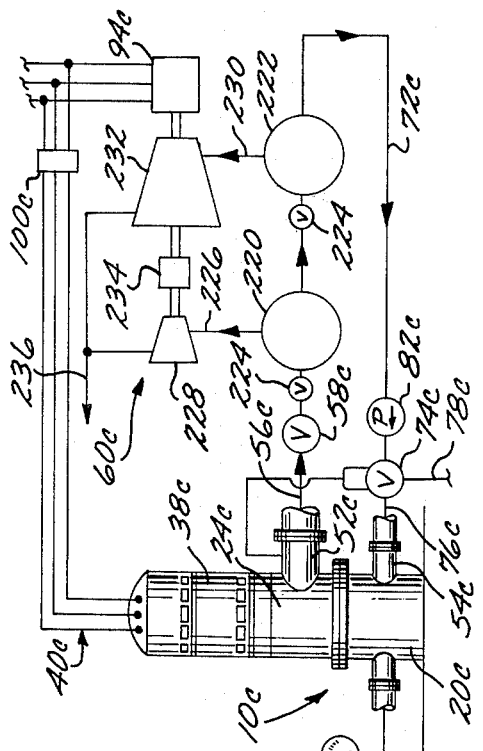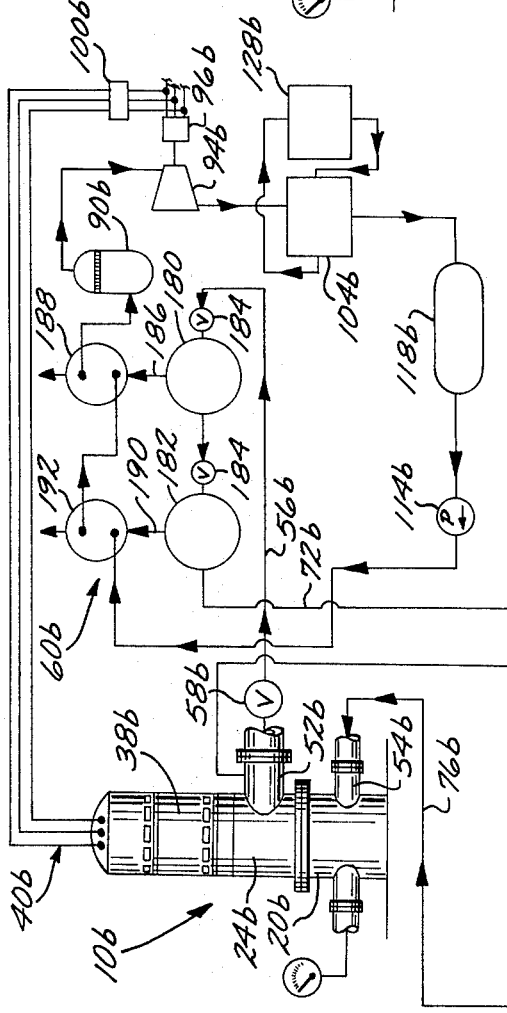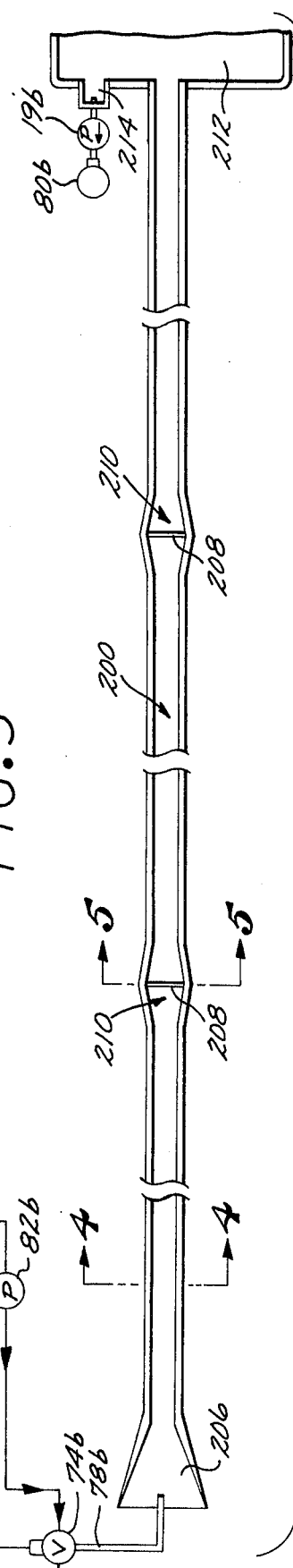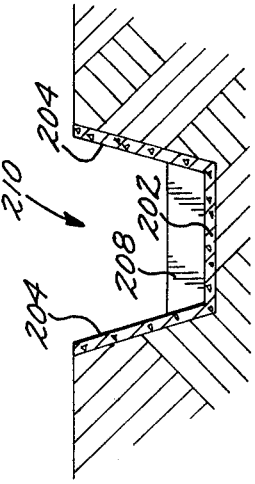

HIGH TEMPERATURE GEOTHERMAL ENERGY SYSTEM

BACKGROUND OF THE INVENTION

1. Field of the Invention

The invention is in the field of electrical power production from high temperature geothermal energy sources.

2. Description of the Prior Art

The conventional practice for generating electrical power from very high temperature geothermal fluid sources, as for example sources of geothermal fluid on the order of 500° F. or hotter, is to allow the hot geothermal fluid to flow up out of a well under the power of its own flashing steam, to separate the available steam at the surface, and then to directly drive steam turbine means with this separated steam. However, there are only a few relatively isolated geographical locations throughout the world where such very hot geothermal fluid sources are available and which have a sufficiently low mineral and chemical content to enable this conventional practice to be utilized.

On the other hand, there are large resources of very high temperature geothermal brines which represent a potential source of thermal energy for the production of electrical power, but which have a mineral and chemical content that prohibits application of the conventional procedure of letting the fluid flash up through a well and then driving a steam turbine with steam separated therefrom. The principal reason why such high temperature geothermal brine could not be handled in the conventional manner is that if it were allowed to flash up through the well under its own power, the associated temperature drop would result in a substantial precipitation within the well, usually of carbonates and/or silica, and these precipitated minerals cause scaling and clogging in the flash zone within the well. Other problems directly associated with such flashing in the well are the loss of otherwise usable thermal energy in the heat of vaporization, and a substantial reduction in the flow rate of hot geothermal liquid due to the large volume occupied by the flashed steam in the well bore.

The only way presently known to the applicants for controlling such flashing of hot geothermal brine in a well is to pressurize the brine by pumping within the well to maintain the pressure on the brine above the saturated vapor pressure of the brine so as to avoid flashing, in accordance with the principles set forth in U.S. Pat. No. 3,757,516 issued to Barkman C. McCabe. If such pumping could be applied to pressurize the fluid in the well, it would greatly reduce or completely eliminate scaling and plugging, avoid loss of the heat of vaporization, and greatly increase the liquid flow volume by eliminating competition for space within the well between the geothermal liquid and flashed steam.

However, the pressurization method defined in said McCabe U.S. Pat. No. 3,757,516 for preventing flashing in the well bore has heretofore not been adaptable for use in very high temperature geothermal wells, for a number of reasons. Thus, present pump technology is inadequate to cope with geothermal fluid temperatures above about 375° to 400° F. Another difficulty is that with conventional procedures it would be very difficult if not impossible to control the activity within a very high temperature geothermal well sufficiently to enable a pump to be "stripped into" the well. According to the pumping method shown and described in the said McCabe U.S. Pat. No. 3,757,516, the pump is located in the well below the flash zone. While such procedure is feasible for temperatures up to about 400° F., it involves serious difficulties where the geothermal fluid is at substantially higher temperatures. Thus, as indicated in FIG. 5 of the McCabe U.S. Pat. No. 3,757,516, at temperatures substantially in excess of 400° F. the pumping load and corresponding power consumption by the pump increase rapidly so as to become impractical. As indicated in FIG. 6 of the McCabe U.S. Pat. No. 3,757,516, for temperatures substantially in excess of 400° F. the pump would have to be suspended so deep in the well as to make the installation overly expensive and impractical in order to prevent cavitation of the pump.

Even assuming that hot brines from such high temperature geothermal fluid sources could have been delivered to the surface by prior art means despite the foregoing problems, there are still further practical problems which would have prevented the commercial production of electrical power by conventional methods and apparatus from geothermal sources having characteristics inherent to many high temperature geothermal deposits. One such problem is the presence in some high temperature geothermal fluids of a high dissolved content of the incondensable gas carbon dioxide, as for example on the order of about 5 to 15% by volume, precluding the use of a condensing turbine for the direct steam turbine generation of power. Another such problem is that the geothermal fluid from some high temperature deposits has a dissolved silica content that may be too high for utilization of liquid-to-liquid heat exchangers for transfer of the thermal energy to a power fluid cycle for generating power as disclosed in the said McCabe U.S. Pat. No. 3,757,516. A further such problem is that some very hot geothermal brines have such high chloride content that the fluid may be too corrosive for use of direct liquid-to-liquid heat exchangers.

The foregoing problems in attempting to utilize high temperature geothermal brines at the surface all relate to the heat transfer and generating part of the system. There are also difficult problems rating to the reinjection of such geothermal brines back into the formation from which the brine was originally extracted for assuring maximum regenerative capacity of the system and to satisfy current environmental requirements. Thus, the high mineral concentration inherent in some of the high temperature geothermal brines result in the precipitation of substantial quantities of minerals out of the fluid as the fluid cools while being conducted to and passed back into the aquifer through a reinjection well. Such precipitated minerals tend to clog the reinjection well and reduce the permeability of adjacent earth formations, and also tend to clog the pipeline to the reinjection well.

The applicants have found that some high temperature geothermal fields include both a source of very hot geothermal fluid and a source of much cooler geothermal fluid. Thus, a high temperature geothermal field may include a relatively deep source of very hot geothermal fluid, as for example above about 500° F., and a relatively shallow source of much cooler geothermal fluid, as for example below about 300° F. In some hot geothermal fields the cooler fluid source may be near the edge of a high temperature geothermal field, either in the same earth formation as the very hot fluid source or in a different formation. In such cases the flow rates from the two sources may differ, the lower temperature source usually providing a much greater rate of fluid flow than the high temperature source. In such a dual source situation, the high temperature source may produce a brine that is too high in mineral content for power production with conventionl methods, or its flow rate may be too low for economical power production; while the low temperature of the low temperature source may make power production therefrom economically undesirable. Accordingly, even though the two geothermal fluid sources may together represent a large potential source of power, prior art methods of producing power from geothermal sources may not be applicable for any commercial power production from the field.

SUMMARY OF THE INVENTION

In view of these and other problems in the art, it is a general object of the present invention to make widespread high temperature geothermal resources of geothermal water available for the first time for the production of electrical power on a commercial basis.

Another object of the invention is to provide novel method and apparatus for positively controlling high temperature geothermal walls against flashing, both during the installation of production equipment in the well and during the operating phase of the well for producing a continuous output flow of hot liquid to be used in surface equipment.

Another object of the invention is to eliminate scaling and plugging in a well that provides access to an underground source of high temperature geothermal brine having a high mineral content such as would result in precipitation of minerals in the well bore if the brine were allowed to simply flow up under the power of its own flashing steam in the conventional manner.

A further object of the invention is to conserve the heat of vaporization that would otherwise be lost to flashing in a high temperature geothermal well.

A further object of the invention is to greatly increase the flow volume from a high temperature geothermal well by eliminating competition for space in the well bore with expanding steam.

A still further object of the invention is to return much of the heat energy remaining in hot geothermal liquid after power has been produced therefrom, back into the production well system.

Yet a further object of the invention is to provide method and apparatus for reducing the temperature of the liquid outflow from a very high temperature geothermal well to within an efficient and practical temperature range for the production of electrical power therefrom, while at the same time making full use of the thermal energy represented by the temperature reduction; and it is also an object of the invention to provide method and apparatus for controlling the temperature of such liquid outflow to a predetermined optimum temperature.

Another object of the invention is to provide method and apparatus for adapting the pumping method and apparatus disclosed in the said McCabe U.S. Pat. No. 3,757,516 for use in very high temperature wells; and it is also an object of the invention to adapt power generating apparatus like that disclosed in said McCabe U.S. Pat. No. 3,757,516 having a separate power fluid cycle using a power fluid such as isobutane, for efficiently generating electrical power from very high temperature geothermal fluid that is normally too hot for such a system.

Another object of the invention is to provide method and apparatus which enables pressurization by pumping of the hot liquid outflow of a high temperature geothermal production well without subjecting the pumping equipment to undesirably high temperatures and/or pressures which might otherwise damage the equipment, thereby permitting the use of present pump technology and equipment in high temperature geothermal wells.

A further object of the invention is to minimize the pumping load, and hence power consumption by the pump, in the pressurization of a high temperature geothermal well for preventing flashing in the well.

A still further object of the invention is to combine the flow from a relatively low temperature geothermal well with that of a high temperature geothermal well in a novel manner both to control the high temperature well against flashing and to normalize the combined outputs of the wells to a temperature range and flow volume that are commercially practical for use in the production of electrical power; whereas either or both of such wells might otherwise be non-commercial for the production of power because of temperature and/or flow volume.

A further object of the invention is to provide method and apparatus for efficiently utilizing the thermal energy from high temperature geothermal brines for generating electrical power even though such brines may be too corrosive or may contain too much silica for direct liquid-to-liquid heat exchange to the generating apparatus and even though steam separated from such brines may contain too much incondensible gas for driving a condensing steam turbine.

Yet a further object of the invention is to provide novel method and apparatus comprising a long open ditch forming a part of the reinjection system for delivering geothermal brine that was used for generating power back to the underground geothermal system through a reinjection well, the long open ditch serving to precipitate out a substantial portion of the mineral or sand content from the brine and eliminating the need for a conventional reinjection pipeline, thereby avoiding clogging or corrosion of a reinjection pipeline and avoiding clogging of the reinjection well.

According to the invention, a pump is positioned down in the well which provides access to the undergound source of high temperature geothermal water or brine, the pump being adapted to pressurize the hot output liquid that is delivered from the well to surface generating equipment against flashing of the hot output liquid as it is delivered to the surface generating equipment. The pump is provided with a novel long tailpipe that is suspended from the pump input so as to extend down deep into the well. Liquid that is substantially cooler than the high temperature brine from the well source is injected into the well from the surface to form a continuously downflowing column about the outside of the pump and tailpipe assembly, and the tailpipe is provided with sufficient length so that the weight of the column of injected liquid applies sufficient pressure against the high temperature brine source proximate the lower end of the tailpipe to prevent flashing of the high temperature brine. In one form of the invention the relatively cool injection fluid is a portion of the output liquid from the power generating apparatus, while in another form of the invention the relatively cool injection liquid is provided from another, cooler underground geothermal source that is located in the same geothermal field as the high temperature geothermal source.

The relatively cool injection fluid is mixed with the high temperature brine proximate the tailpipe to produce the hot output liquid that is delivered to the surface generating apparatus by the pump, this output liquid having a temperature that is intermediate the temperature of the high temperature geothermal liquid and the temperature of the injection liquid. This intermediate temperature of the well output liquid enables the pump to operate at a sufficiently low temperature, and under a sufficiently low pressure head, to come within the capability of present pumping equipment and technology and to minimize the power that is drawn by the pump.

Thus, the method and apparatus of the present invention assures pressurization of both the high temperature geothermal source fluid and the hot output liquid delivered from the well to an extent that will prevent flashing at any point in the well. As a result, scaling and plugging in the well are eliminated, an output liquid temperature is provided that is optimum for efficient power production, some of the heat of vaporization that would otherwise have been lost in flashing is conserved, and the flow volume from the well is greatly increased by eliminating competition for space in the well with flashing steam. In the form of the invention which utilizes a portion of the output liquid from the power generating apparatus as the injection fluid, some of the heat energy of the geothermal liquid that was used for the production of power is returned back into the system to increase the thermal efficiency of the system.

Heat energy from the hot output liquid provided by the well may be transferred through heat exchanger means to a separate power fluid cycle in the power generating apparatus, either in a liquid-to-liquid heat exchange, or in a gas-to-liquid heat exchange using flashed steam from the hot liquid; or flashed steam from the hot liquid may be used to directly drive a conventional steam turbine.

The long tailpipe also enables the high temperature well to be controlled during introduction of the pump string into the well, by flowing cold water down into the well from the surface through the pump string and tailpipe whereby the long tailpipe delivers the cold water deep down in the well far in advance of the pump string to effectively "kill" the well during insertion of the pump string.

The invention also comprises novel concrete ditch reinjection conduit means having traps therein for minerals and sand which is adapted to precipitate out a substantial quantity of the mineral content from a highly concentrated brine that may be used for generating power, while at the same time delivering the used brine to a reinjection well for return of the brine to the underground geothermal system. The long concrete ditch with mineral and sand traps thus substantially lowers the mineral and sand content of the liquid that is to be reinjected into the ground, thereby preventing minerals from being precipitated in the reinjection well or its proximate geological formations and preventing entrained sand in the liquid from damaging the reinjection pump or plugging the reinjection well. The long concrete ditch further avoids the need for a conventional reinjection pipeline which would be vulnerable to clogging from precipitation or corrosion from the brine.

The long concrete ditch further enables the reinjection well to be disposed as remote as desired from the high temperature production well to minimize thermal contamination of the high temperature geothermal fluid source by cool fluid injected back into the same formation that contains the high temperature source.

BRIEF DESCRIPTION OF THE DRAWINGS

These and other objects of the invention will become more apparent in view of the following description and the accompanying drawings, wherein:

FIG. 3 is a diagrammatic view illustrating a form of the invention wherein the hot geothermal liquid output from the controlled high temperature geothermal well is flashed to steam and the steam passed through heat exchangers for transferring heat energy to power generating apparatus employing a separate power fluid circuit, FIG. 3 also showing the long concrete ditch reinjection conduit means of the invention for precipitating out minerals from high concentration reinjection brine;

FIG. 4 is a cross-sectional view taken on the line 4—4 in FIG. 3;

FIG. 5 is a cross-sectional view taken on the line 5—5 in FIG. 3; and

FIG. 6 is a diagrammatic view illustrating a form of the invention wherein the hot geothermal liquid output from the controlled high temperature geothermal well is flashed to steam which directly drives steam turbine generating apparatus.

DETAILED DESCRIPTION

Figure 1:
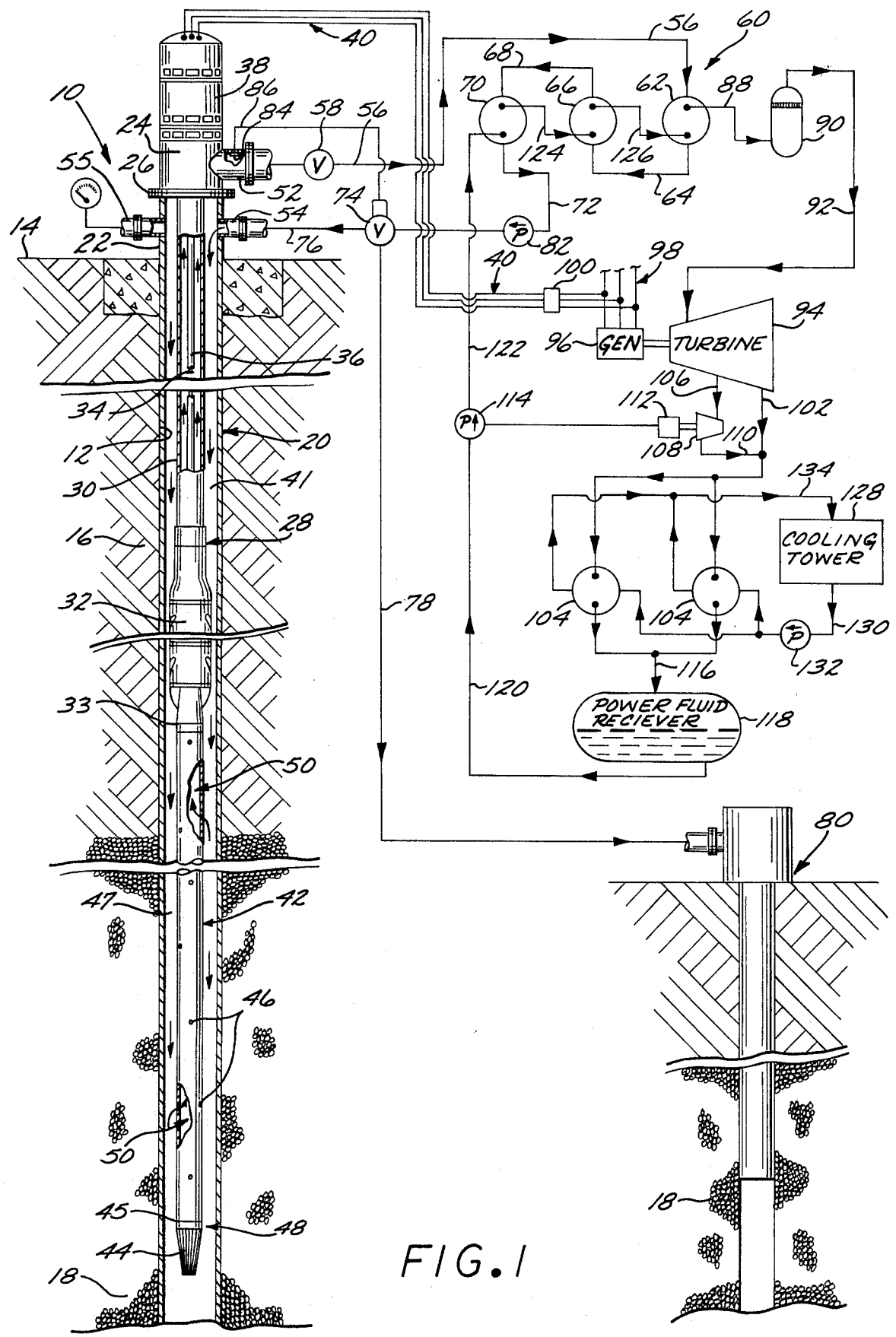
FIG. 1 is a diagrammatic view illustrating one form of the present invention wherein the relatively cool injection liquid that is employed in controlling a high temperature geothermal well is a portion of the output liquid from the power generating apparatus.

FIG. 1 of the drawings diagrammatically illustrates apparatus and method according to the invention for generating electrical power by means of the thermal energy derived from a high temperature geothermal fluid production well wherein the bottom hold fluid temperature may, for example, be on the order of 500° F. or greater. The system illustrated in FIG. 1 is generally similar to the system that is shown in FIG. 1 of the aforesaid McCabe U.S. Pat. No. 3,757,516, including a primary geothermal fluid production well which provides its fluid output to heat transfer and generating means, with a first portion of the used, cooled geothermal fluid being returned to the primary well to cooperate with pumping means therein to control the temperature and prevent flashing in the primary well, and a second portion of the used, cooled geothermal fluid being returned to the aquifer through a reinjection well. However, the system illustrated in FIG. 1 of the present application embodies improved means for positively controlling the high temperature well against flashing both during the assembly stage of "stripping in" the pump and during the operating phase of the well for producing power, such improved means including a novel long tail pipe assembly depending from the pump and automatic temperature controlled valve means for dividing the flow volume of the used fluid between the primary well and the reinjection well.

The high temperature geothermal production well shown at the left side of FIG. 1 is generally designated 10, and includes a well bore 12 extending down from the surface 14 of the ground to provide access to a subsurface reservoir of very hot geothermal fluid. The well bore 12 extends first through an upper earth formation 16 of low permeability which generally will be present to prevent steam from escaping from below, and thence into a lower porous formation 18 which contains the hot geothermal fluid. A casing 20 is cemented in proximate the surface 14, and extends downwardly into the well bore 12 from the surface into the region of the porous formation 18, the casing 20 opening into the reservoir of hot geothermal fluid in the porous formation 18. The reservoir of hot geothermal fluid is under high pressure due to the weight of the overhead earth formations and the thermal activity of the reservoir, so that there will automatically be a substantial rate of flow of the hot geothermal fluid upwardly through the casing 20.

The well casing 20 has a head portion 22 to which well discharge head structure 24 is attached by means of a flanged connection 26. A turbine pump generally designated 28 is suspended down in the well casing 20, the pump 28 including a tubular water column 30 which supports pump turbine bowls 32 at its lower end and is suspended at its upper end from the well discharge head structure 24. The lower end 33 of the pump 28 is the fluid inlet of the pump for receiving hot geothermal fluid from the well. The turbine pump 28 also includes drive shaft 34 that is enclosed within a sleeve 36 centrally disposed in water column 30, the shaft 34 being driven by a motor 38 that is mounted on discharge head structure 24. Motor 38 is preferably an electric motor that is driven by electrical power furnished through conductors 40 which preferably derive electrical power from the power plant served by the well 10. The amount of electrical power required to drive the motor 38 is only a very small percentage of the total electrical power output of the plant, as is explained in detail in the aforesaid McCabe U.S. Pat. No. 3,757,516.

The outside diameters of the water column 30 and turbine bowls 32 are substantially smaller than the inside diameter of the casing 20 so as to provide a substantial annulus 41 for the reinjection of used, cooled geothermal fluid downwardly through the casing past the pump and into mixing zones that are located in the well a substantial distance below the lower, input end 33 of the pump.

The geothermal power system illustrated in FIG. 1 is adapted for power production from a high temperature geothermal well 10 of the type which may heretofore not have been commercially desirable for the production of electric power because of low productivity and/or the mineral and chemical content of the hot geothermal fluid will not permit use of the conventional practice for generating power from high temperature geothermal sources of letting the fluid simply flow up and out of the well under the power of its own flashing steam, and then separating the steam and directly generating the power with steam turbines. Thus, the hot geothermal fluid from the underground reservoir in porous formation 18 may be such that if allowed to flash up under its own power would cause scaling and plugging in the casing with precipitated carbonates and/or silica such as to render the well non-commercial. Hence, the pump means 28 is employed in the well pursuant to the method defined in detail in the said McCabe U.S. Pat. No. 3,757,516 to maintain the pressure on the fluid above the saturated vapor pressure of the fluid so as to avoid flashing.

However, the applicants have determined that in some circumstances, particularly where the geothermal fluid source is very hot, it is not feasible to dispose the pump deep down in the well proximate the geothermal fluid source and rely upon the pump to carry the entire pressurization load for preventing the flashing of the fluid as it passes from the deep well source all of the way up through the casing to the surface. Thus, present pumping equipment and methods limit the temperature of the fluid which can be pumped to a maximum temperature of about 400° F., and preferably not more than about 375° F., while many geothermal reservoirs having good flow volumes when tapped have temperatures substantially in excess of 400° F. For example, geothermal fluid resources appear to be available in or near the Imperial Valley region of Southern California, U.S.A., having temperatures in the range of about 510° to 520° F. Other problems in attempting to prevent flashing by pumping proximate such high temperature geothermal sources are difficulties encountered in "stripping in" the pump; the very large pumping load and corresponding large power consumption by the pump, to prevent flashing in the bore (as indicated by FIG. 5 of the said McCabe U.S. Pat. No. 3,757,516, which is a plot of pump pressure to prevent flashing against temperature of the geothermal fluid source); as well as the need for a large pressure head at the pump inlet to avoid cavitation in the pump (as indicated by FIG. 6 in said McCabe U.S. Pat. No. 3,757,516, which is a plot of well depth below the drawdown level against temperature of the geothermal fluid source), which would require the pump to be placed so deep in many cases as to make the installation overly expensive and impractical.

The experience of the applicants in drilling numerous geothermal wells indicates that for many high temperature geothermal wells these problems could not be overcome by simply reinjecting a portion of the used, cool geothermal fluid back into the annulus between the well casing and pumping column as described in said McCabe U.S. Pat. No. 3,757,516 in connection with FIG. 1 thereof, if conventional pumping equipment and technology were employed. While a conventional turbine pump of the type which may be employed in a well may sometimes include a tail pipe, this is normally no longer than about 20 to 30 feet, which would place the mixing zone between the downflowing reinjection fluid and the upflowing production fluid generally proximate the pump inlet. Since the practical working depth for such a pump is only on the order of about 500 to 600 feet below the drawdown level in the well and most high temperature geothermal fluid sources observed by the applicants are on the order of from about 2,000 feet to about 5,000 feet or more in depth, this would not allow a sufficient height of the downflowing reinjection fluid for the weight thereof to prevent substantial flashing of the upflowing hot production fluid, so that scaling and clogging of the well would occur below said mixing zone. Also, this approach would still not control the well sufficiently for the pump to be stripped in. Further, the sudden encounter between the cool reinjection fluid and the hot production fluid proximate the inlet of the pump or short tail pipe would be likely to result in "slugging" wherein slugs of improperly mixed hot and cool fluids would be picked up by the pump, and this would not only render power production of the plant unreliable, but it could cause some flashing and might also cause pump damage from slugs of the hot production fluid.

All of these problems are eliminated according to the present invention by providing the pump means 28 with a long tail pipe 42 which is connected at its upper end to the lower, input end 33 of pump 28, the tail pipe 42 depending from the pump 28 and extending for a substantial distance down through the casing 20 into the deeper, hotter part of the well. A conventional perforated liner or strainer 44 is connected to the open lower end 45 of long tail pipe 42, depending therefrom. The O.D. of the long tail pipe 42 is substantially less than the I.D. of casing 20 so as to provide a substantial annulus 47 between the long tail pipe 42 and the casing 20 to allow the free passage of used, cool reinjection fluid downwardly through this annulus 47 into a fluid encounter zone generally designated 48 within the well proximate the lower end 45 of tail pipe 42.

The primary purpose of the long tail pipe 42 is to define a reinjection fluid column, applied from above to the very hot geothermal production fluid through the annuli 41 and 47, which has sufficient depth so that its weight will apply a pressure against the production fluid that is greater than the saturated vapor pressure of the very hot production fluid, whereby the production fluid is prevented from flashing in the well. The pressure of the relatively cool downwardly flowing reinjection fluid against the relatively hot upwardly flowing production fluid at the encounter zone 48 will cause most of the hot production fluid to flow into the lower end 45 of the tail pipe and thence upwardly through the long tail pipe 42 and into the pump 28.

In order to provide improved mixing between the relatively cool reinjection fluid and the relatively hot production fluid, and to avoid the possibility of slugging into the lower end 45 of the long tail pipe 42 and thence through the tail pipe 42 and into the pump 28, it is preferred to provide a series of diffusion ports 46 along the length of the long tail pipe 42. These diffusion ports 46 will cause gradual dispersion of the relatively cool reinjection fluid into the relatively hot production fluid along the length of the long tail pipe 42 as the production fluid flows upwardly through the tail pipe 42, and in this way the fluid mixture becomes generally cooler from the bottom to the top of tail pipe 42. Thus, the entire length of the long tail pipe 42 may be considered to be a primary fluid mixing zone 50. It is preferred to have the diffusion ports 46 generally uniformly spaced along the length and about the periphery of the long tail pipe 42, although it is to be understood that if desired the diffusion ports 46 may be arranged in localized groups disposed at more widely spaced intervals along the length of tail pipe 42.

The diffusion ports 46 are preferably provided in sufficient number and of sufficient size to achieve substantially equal dispersion of the relatively cool reinjection fluid into the relatively hot production fluid along the entire length of the long tail pipe 42, so as to provide a generally even or linear reduction of the fluid temperature in tail pipe 42 along its entire length from its lower end 45 upwardly. However, there will normally be some mixing of the cool reinjection fluid with the hot production fluid in the region of the encounter zone 48, so that the encounter zone 48 may be considered to be a secondary mixing zone.

If there are too few of the diffusion ports 46, or if they are of insufficient size, then there will tend to be a greater amount of mixing of the two fluids in the encounter zone 48 and in the lower portion of the long tail pipe 42, but this will not in any way detract from the operation of the invention in preventing flashing in the well. However, if there were too many of the diffusion ports 46 or if they were of too large a size, then more mixing would tend to occur in the upper portion of tail pipe 42, tending to apply increased temperature at decreased pressure levels, and if carried too far this could result in flashing within the well.

Any of the relatively hot production fluid which may tend to flow upwardly into the annulus 47 between the long tail pipe 42 and the casing 20 will become mixed with the relatively cool reinjection fluid in annulus 47 and will flow into the primary zone 50 within the tail pipe through the diffusion ports 46.

The applicants have observed that geothermal wells tend to vary widely as to both pressure and flow volume, and accordingly the number and/or size of the diffusion ports 46 will also vary to provide the desired equal dispersion of the relatively cool reinjection fluid into the relatively hot production fluid along the length of the tail pipe 42.

Although it is preferred for the foregoing reasons to embody the diffusion ports 46 in the long tail pipe 42, if the long tail pipe 42 should be employed according to the invention without the diffusion ports 46, then the primary zone for mixing of the relatively cool downflowing reinjection fluid and the relatively hot upflowing production fluid would be in the region of the encounter zone 48, and a secondary mixing would occur through turbulence within the tail pipe 42.

The fluid mixture from the long tail pipe 42 passes upwardly into turbine pump 28 which pumps the mixture upwardly through water column 30 at a pressure substantially above the saturated vapor pressure of the mixture for the temperature of the mixture. The mixture flows upwardly from water column 30 into the well discharge head structure 24 and then out of the well through well discharge port 52 on head structure 24. A reinjection port 54 is connected to the casing head 22 so as to communicate with and provide the reinjection fluid into the annulus 41 between water column 30 and casing 20.

The fluid mixture of intermediate temperature between the temperature of the hot well production fluid and the cool, used reinjection fluid is delivered from well discharge port 52 through a fluid delivery conduit 56 having a pressure control valve 58 therein to heat transfer and generating means generally designated 60. As will be seen from the description below, the flow volume of the cooled, used reinjection fluid that is reinjected into the well through reinjection port 54 is automatically adjusted so that the fluid mixture provided at well discharge port 52 is adjusted to a predetermined temperature. The pressure control valve 58 is adjustably set to a pressure that is substantially higher than the saturated vapor pressure of the fluid mixture provided at discharge port 52 so as to prevent flashing of the mixture between the pump 28 and pressure control valve 58. For example, if the regulated temperature of the fluid mixture provided at well discharge port 52 is 350° F., than the saturated vapor pressure thereof is 134 psia. The pressure control valve 58 may then be set to hold the pressure between pump 28 and valve 58 at about 180 psia so as to avoid any possibility of flashing of the mixture even if there may be some fluctuation in the system. Suitable pressure gradients may then be maintained throughout the heat transfer and generating means 60, as described in detail in the said McCabe U.S. Pat. No. 3,757,516, so as to avoid flashing of the mixture as it passes through the heat transfer and generating means 60 and returned partly to the reinjection port 54 and partly to a reinjection well.

The hot geothermal fluid mixture passes from pressure control valve 58 through fluid delivery conduit 56 into a first heat exchanger 62 wherein the hot fluid mixture gives up some of its heat energy to a power fluid for superheating the power fluid. The hot geothermal mixture then passes from the first heat exchanger 62 through a conduit 64 into a second heat exchanger 66 wherein the hot fluid mixture gives up more of its heat energy for vaporizing or boiling the power fluid. The hot geothermal fluid mixture then passes from the second heat exchanger 66 through a conduit 68 into a third heat exchanger 70 wherein the remaining useful heat energy from the hot mixture is transferred to the power fluid to preheat the power fluid. From the third heat exchanger 70 the fluid mixture then passes through an output conduit 72 to a temperature control valve 74 which divides the flow of the used, cooled geothermal fluid mixture so that a portion of it is returned to the primary well 10 and the remainder of the fluid is directed to a separate reinjection well. Thus, the temperature control valve 74 has a first output conduit 76 which communicates with the reinjection port 54 of primary well 10 and a second output conduit 78 which communicates with the separate reinjection well 80 wherein surplus reinjection fluid is returned back to the earth, either back into the same formation 18 from which the very hot geothermal fluid was derived by the primary well 10, or into a deeper zone or a shallower zone.

A temperature sensor 84 is disposed in the primary well discharge port 52 and is connected to the temperature control valve 74 by suitable temperature sensing signal conductor means 86, whereby the temperature control valve 74 is enabled to adjust the rate of flow of reinjection fluid through its first output conduit 76 back into the reinjection port 54 to maintain the temperature of the geothermal fluid mixture provided at well discharge port 52 at the desired predetermined temperature.

A maximum preferred temperature range for the geothermal fluid mixture provided at well discharge port 52 is from about 300° to about 400° F., and within such range the presently preferred temperature range for the geothermal fluid mixture is from about 325° to about 375° F. Thus, the temperature control valve 74 will adjust the reinjection fluid flow back to the primary well through reinjection port 54 so as to stabilize the temperature of the geothermal fluid mixture fromm well discharge port 52 at some particular temperature within these preferred ranges. The power fluid referred to above to which the heat energy of the geothermal fluid mixture is transferred in the heat exchangers 62, 66 and 70 is contained in a closed cycle power system for a Rankine heat engine cycle as set forth in detail in said McCabe U.S. Pat. No. 3,757,516. The presently preferred power fluid for this closed Rankine cycle system is isobutane — $(CH_3)_3CH$ — because isobutane is particularly efficient in the aforesaid preferred temperature ranges for the geothermal fluid mixture that is applied to the heat transfer and generating means 60. The aforesaid preferred temperature ranges are determined by factors of thermal efficiency, controllability of the very hot geothermal well, pump technology, and pumping load and therefore pump power consumption. Nevertheless, isobutane is particularly efficient for these temperature ranges as a power fluid that receives its heat energy from the geothermal fluid mixture to heat exchangers and is employed in a Rankine heat engine cycle wherein power generation is accomplished by energy recovery in gas expansion power turbines.

While the presently preferred power fluid for the closed Rankine cycle of the present invention is thus isobutane, it is to be understood that the invention is not limited to the use of isobutane as a power fluid, and that other power fluids can be used within the scope of the invention. Also, it is to be understood that if desired more than one closed Rankine cycle system may be employed to successively receive thermal energy from the geothermal fluid mixture provided by the well 10, with different power fluids being employed therein for maximum efficiency, as set forth in the said McCabe U.S. Pat. No. 3,757,516. It is further to be understood that if desired a mixture of different power fluids may be employed in the closed Rankine cycle system instead of just a single fluid such as isobutane.

In the closed cycle power system, the power fluid is delivered in its superheated state from the heat exchanger 62 through a conduit 88, a K.O. tank 90 and a conduit 92 to power turbine 94 that is drivingly connected to electric power generator 96. The generator 96 delivers electric power to output power line means 98, a small fraction of the power from which may be delivered through transformer means 100 to the conductors 40 for driving the geothermal well pump motor 38.

The power fluid, still in vapor form, leaves the turbine 94 through exhaust conduit 102 which passes the power fluid through condensers 104 wherein the waste heat is rejected from the power fluid as part of the Rankine cycle to convert all of the power fluid from its gaseous state into its liquid state. A small portion of the power fluid is extracted from turbine 94 at an intermediate stage thereof through extraction conduit 106 so as to drive the power fluid pump turbine 108, such portion of the power fluid being returned to the main power fluid exhaust stream through an exhaust conduit 110. The pump turbine 76 drives through a speed reducer 112 to power fluid pump 114 which pressurizes the power fluid to its maximum operational pressure in the Rankine cycle prior to introduction of the power fluid into the heat exchangers to receive heat energy from the geothermal fluid mixture.

The liquid power fluid from condensers 104 is passed through conduit means 116 into a power fluid receiver 118, and the liquid power fluid is delivered therefrom at low pressure through a conduit 120 to the power fluid pump 114, which delivers the power fluid in its liquid state through high pressure fluid conduit 122 into the heat exchanger 70, wherein the power fluid is heated but not vaporized. The power fluid then passes from heat exchanger 70 through conduit 124 into heat exchanger 66 wherein the power fluid is vaporized or boiled, and then the power fluid passes through a conduit 126 into the heat exchanger 62, wherein the power fluid is superheated and provided with its maximum temperature preparatory to driving the power turbine 94.

The waste heat that is extracted from the power fluid in condensers 104 after the energy of the power fluid has been delivered to turbine 94 is rejected in a cooling tower 128 or other conventonal cooling means, such as a cooling pond or the like. Cooling tower 128 is a part of a separate cooling water circuit which includes a conduit 130 that conducts cooling water from tower 128 to a circulating pump 132 which circulates the cooling water through the condensers 104 and thence through a return conduit 134 back to cooling tower 128.

The total length of the pumping column of pump 28 and the long tail pipe 42 is determined principally by the bottom hole temperature of the well 10. According to the present invention the minimum depth at which the lower end 45 of the tail pipe is located down in the well is the depth at which the total pressure applied from above through the annuli 41 and 47 against the hot geothermal production fluid is sufficient to prevent flashing of the production fluid. This total pressure applied from above is primarily from the weight of the reinjection fluid column in annulus 41 and annulus 47, but also includes atmospheric pressure on such column and any additional pressure that may be applied to such column by the reinjection pump 82. In practice the lower end 45 of the long tail pipe is preferably placed somewhat below such minimum depth to provide complete assurance against flashing of the very hot production fluid as it rises in the well despite any fluctuations which may occur in the system.

The pump 28 must be disposed sufficiently deep in the well so that the pressure of the reinjection fluid in annulus 41 at substantially the level of the lower end 33 of the pump will be sufficient to prevent cavitation in the pump, and the amount of this required pressure corresponds to the saturated vapor pressure of the mixture relatively hot geothermal production fluid and relatively cool reinjection fluid at the temperature of the mixture as it is applied to the pump. The minimum depth for the pump 28 at which the required pressure is present to prevent cavitation is determined by a summation of the weight of the reinjection fluid column above the pump, atmospheric pressure on the reinjection fluid column, and any additional pressure which may be supplied by the reinjection pump 82.

The pump 28 will be disposed at a sufficient depth below the level required to avoid cavitation so as to account for any possible fluctuations that may occur in the system. Nevertheless, it is preferred that the pump not be placed lower than is necessary to provide assurance against cavitation, because the deeper the pump is located in the well, the greater the pumping head and hence energy consumption of the pump, and the more expensive the pump is and more difficult the pump is to insert in the well.

Accordingly, the minimum length required for the long tail pipe 42 will correspond approximately to the length of the liquid column in annulus 47 required for the weight of such column to develop a pressure corresponding to the difference between the saturated vapor pressure of the very hot production fluid and the fluid pressure present in the annulus proximate the level of the pump inlet 33. Thus, the weight of the lower liquid in annulus 47 below the pump inlet 33 corresponding to the minimum required length for the long tail pipe 42, when added to the weight of the upper liquid column in annulus 41 above the pump inlet 33, atmospheric pressure and any additional pressure from reinjection pump 82, will result in a total pressure applied down through the annulus 47 at least as great as the saturated vapor pressure for the very hot geothermal production fluid.

The length of the tail pipe that will be required for a particular installation may be roughly estimated from the temperature of the hot production fluid and the temperature that is selected for the fluid mixture that is to be pumped, the estimated tail pipe length corresponding to the liquid column height in annulus 47 that would apply a pressure equal to the difference between the saturated vapor pressure of the hot production fluid and the saturated vapor pressure of the fluid mixture. As indicated above, in actual practice the pump will be placed at a somewhat greater pressure level (lower in the well) than the saturated vapor pressure corresponding to the temperature of the fluid mixture, so as to assure against cavitation. However, using the saturated vapor pressure of the mixture as one of the criteria will simply provide an estimated length for the tail pipe that is somewhat greater than the absolute minimum length required, which will provide a desired assurance against any possible flashing of the hot geothermal production fluid in the well.

Using this approach for estimating the length of the tail pipe that will be required for any particular installation, the following is an example of how the minimum tail pipe length may be estimated for a particular geothermal production fluid temperature and a selected temperature for the fluid mixture is to be pumped. Since the density of the reinjection liquid in annulus 47 will depend upon its temperature, the reinjection fluid will be assumed to come from heat transfer and generating means 60° at 179° F. as discussed hereinafter, and will be assumed for the purpose of the present example to be heated as it flows down in the well to an average temperature of about 200° F. in annulus 47. For the present example it will also be assumed that the temperature of the hot geothermal production fluid is about 500° F. and that the temperature of the fluid mixture to be pumped is about 350° F., this mixture being at the midpoint in the preferred temperature ranges for the mixture set forth hereinabove. The flash point for the 500° F. production fluid is approximately 680 psia, and the flash point for the 350° F. fluid mixture is about 134 psia, the pressure difference between these flash points about 546 psia, which corresponds to a water column at 200° F. approximately 1,310 feet long. Thus, for the assumed temperatures the estimated length for the tail pipe that will be required is approximately 1,310 feet.

The foregoing example was figured on the basis of the density of pure water at 200° F., whereas the reinjection fluid column will actuallly be a brine having a slightly greater density. However, as seen in an example given hereinafter for a test well in North Brawley, Calif., the difference is minimal and need not be considered in the present rough estimate for the tail pipe length.

For this same example, in actual practice the pressure on the pump may be selected to be on the order of about 180 psia to provide complete assurance against cavitation, in which case the absolute minimum length required for the tail pipe would correspond to a liquid column that would exert 680 psia - 180 psia = 500 psia, which would be approximately 1,200 feet. Thus, the estimated minimum length required for the tail pipe which was based solely upon a consideration of the saturated vapor pressures for the temperatures involved would be slightly more than 100 feet longer than the absolute minimum tail pipe length required for the actual pressure at the pump. This approximately 100 feet additional length for the tail pipe is desired in practice as assurance against flashing of the hot geothermal fluid in view of possible fluctuations in the system.

The minimum bottom hole temperature of a geothermal production fluid well in which the long tail pipe apparatus and method of the present invention are usable to advantage is about 375° F. Below about 375° F. it will normally be satisfactory to directly pump the hot geothermal fluid in accordance with the teachings of the said McCabe U.S. Pat. No. 3,757,516 without requiring the long tail pipe. The maximum bottom hole temperature of a well in which the present long tail pipe apparatus and method may be applied is about 675° F. Any higher temperature tends to come too close to the critical temperature of steam, which is about 705° F.

The following chart provides some examples of estimated minimum tail pipe lengths determined as in the foregoing example according to the differences between the flash pressures for the temperatures of the hot production fluid and the fluid mixture, within a temperature range of from 375° to 600° F. for the hot geothermal production fluid and a range of from 300° to 400° F. for the mixture between the relatively cool reinjection fluid and the relatively hot production fluid, and with an assumed average temperature of 200° F. for the reinjection fluid in the annulus 47:

| Hot Fluid Temp. (° F.) | Hot Fluid Flash Pressure (psia) | Mixture Fluid Temp. (° F.) | Mixture Flash Pressure (psia) | Pressure Difference (psia) | Minimum Est. Tail Pipe Length (ft.) |
|---|---|---|---|---|---|
| 375 | 186 | 300 | 67 | 119 | 285 |
|  |  | 325 | 96 | 90 | 216 |
|  |  | 350 | 134 | 52 | 125 |
| 400 | 245 | 300 | 67 | 178 | 427 |
|  |  | 325 | 96 | 149 | 357 |
|  |  | 350 | 134 | 111 | 266 |
|  |  | 375 | 186 | 59 | 141 |
| 450 | 423 | 300 | 67 | 356 | 852 |
|  |  | 325 | 96 | 327 | 781 |
|  |  | 350 | 134 | 289 | 693 |
|  |  | 375 | 186 | 237 | 568 |
|  |  | 400 | 245 | 178 | 427 |
| 500 | 680 | 300 | 67 | 613 | 1470 |
|  |  | 325 | 96 | 584 | 1400 |
|  |  | 350 | 134 | 546 | 1310 |
|  |  | 375 | 186 | 494 | 1180 |
|  |  | 400 | 245 | 435 | 1040 |
| 550 | 1045 | 300 | 67 | 978 | 2340 |
|  |  | 325 | 96 | 949 | 2270 |
|  |  | 350 | 134 | 911 | 2180 |
|  |  | 375 | 186 | 859 | 2060 |
|  |  | 400 | 245 | 800 | 1920 |
| 600 | 1550 | 300 | 67 | 1483 | 3550 |
|  |  | 325 | 96 | 1454 | 3480 |
|  |  | 350 | 134 | 1416 | 3390 |
|  |  | 375 | 186 | 1364 | 3270 |
|  |  | 400 | 245 | 1305 | 3130 |

Referring to the above chart, it will be seen that in all instances except where the bottom hole temperature is at the low values of 375° and 400° F. and where the mixture temperature is only 25° below the bottom hole temperature, the minimum estimated tail pipe length is greater than 200 feet. In practice, the temperature of the mixture will normally be more than 25° F. lower than the temperature of the geothermal production fluid, and accordingly in practice a presently preferred minimum length for the long tail pipe of the invention is about 200 feet.

In addition to the function described above for the long tail pipe 42 of preventing flashing of the very hot geothermal production fluid, a further important function of the long tail pipe is to enable the very hot geothermal well to be controlled while the pump is being run into the well. Typically the pump must be run in to a depth of on the order of 200 to 500 feet in the well. If the geothermal production fluid is very hot, as for example on the order of about 500° F., the presence of this very hot geothermal fluid flashing up through the well would make it practically impossible to run the pump string into its operative position with the use of conventional methods. While it is a known practice to attempt to kill a hot well for stripping in a pump string by running cold water into the well, nevertheless with conventional methods and equipment there is no way to get this flow of cold water down deep enough into the well for controlling such very hot geothermal fluid.

However, as distinguished from the generally difficult problem of stripping in a pump string, it is relatively easy to strip tubing into a well, even where very hot geothermal production fluid is encountered, and inasmuch as the long tail pipe 42 of the present invention is tubing, the long tail pipe can be stripped into the well in advance of the pump string without substantial difficulty. Then, by running cold water down through the pumping column and thence through the long tail pipe, the cold water can be flowed down deep into the well to cool off the well down near the source of the hot geothermal fluid while the pump column itself is being stripped into the well. For example, as seen from the above chart, for a hot geothermal production temperature of 500° F. and a proposed selected temperature of 350° F. for the mixture that will be established between the hot geothermal fluid and the cool reinjection fluid, a tail pipe on the order of 1300+ feet will be employed, so that with this long tail pipe connected below the pump string, the cold water can be dispensed more than 1300 feet down into the well in advance of the pump as the pump is being stripped into the well, and this is sufficient to provide excellent control of the well while the pump is being stripped in.

When the well installation has been completed, with the pumping column and long tail pipe installed as illustrated in FIG. 1 of the drawings, then operation of the well will normally be commenced by injecting cold water into the well through the reinjection port 54, this cold water passing downwardly through the annuli 41 and 47 to control the hot geothermal production fluid until operation of the system produces the desired flow of reinjection fluid from output conduit 72 of heat transfer and generating means 60 through temperature control valve 74 and its output conduit 76. This flow of reinjection fluid into the well through reinjection port 54 will then take over from the injected cold water in controlling the well against flashing, and will be automatically adjusted by the temperature control valve 74 to stabilize the temperature of the fluid mixture pumped out through well discharge port 52 at a predetermined temperature for the mixture.

The temperature of the reinjection fluid provided to the primary well 10 from the heat transfer and generating means 60 will depend upon the type of heat transfer and generating means 60 that is employed in the system. Thus, where the thermal energy from the well 10 is provided through heat exchangers to a power fluid consisting of isobutane in a closed Rankine cycle system, as described hereinabove and as set forth in detail in the said McCabe U.S. Pat. No. 3,757,516, then the temperature of the reinjection fluid provided by heat transfer and generating means 60 may be on the order of 179° F. On the other hand, if some other power fluid is employed, or a mixture of power fluids is employed, or if a succession of separate Rankine cycles utilizes difference power fluids, then the temperature of the reinjection fluid provided by heat transfer and generating means 60 will be different, and may be either higher or lower than the approximately 179° F. for the straight isobutane power fluid. Further, if the geothermal fluid mixture provided from the well through discharge port 52 is flashed to steam in heat transfer and generating means 60, either for use of the steam in heat exchangers as discussed hereinafter in connection with FIG. 3 of the drawings, or for direct steam generating as discussed hereinafter in connection with FIG. 6 of the drawings, then the reinjection fluid will be at or above the flash point for atmospheric pressure, which is 212° F. at sea level.

The temperature control valve 74 will automatically control the rate of flow of the reinjection fluid back to primary well 10 so as to establish a ratio of the flow of cool reinjection fluid to the flow of hot production fluid that will produce the predetermined, selected mixture temperature that is provided at the well discharge port 52. This ratio may be expressed as follows:

$$F_c/F_h = T_h/T_c$$

where:
$F_c$ = rate of flow of cool reinjection fluid
$F_h$ = rate of flow of hot production fluid
$T_h$ = difference between the temperatures of the hot production fluid and the fluid mixture
$T_c$ = difference between the temperatures of the fluid mixture and the cool reinjection fluid Thus, the rate of flow of the cool reinjection fluid provided by temperature control valve 74 to reinjection port 54 may be expressed as follows:

$$F_c = F_h(T_h/T_c)$$

By way of example, if the hot production fluid temperature is 500° F., the cool reinjection fluid temperature is 179° F., and the selected temperature for the mixture is 350° F., then $T_h$ = 500° F. − 350° F. or 150° F., and $T_c$ = 350° − 179° F. or 171° F. For this example $F_c$ = 0.887 $F_h$.

As another example, if the hot production fluid temperature is assumed to be 500° F. and the selected mixture temperature is assumed to be 350° F., but if the mixture is flashed to steam at sea level atmospheric pressure and the reinjection fluid temperature is 212° F., then $T_h$ = 500° F. − 350° F. = 150° F., and $T_c$ = 350° F. − 212° F. = 138° F. For this example $F_c$ = 1.09 $F_h$.

If it is desired to provide equal flow rates for the hot production fluid ($F_h$) and the cool reinjection fluid ($F_c$), then the difference between the temperatures of the hot production fluid and the fluid mixture ($T_h$) will be equal to the difference between the temperatures of the fluid mixture and the cold reinjection fluid ($T_c$), so that simple temperature averaging can be employed to determine the temperature of the geothermal fluid mixture that will be provided at well discharge port 52. In this case, if the hot production fluid temperature is assumed to be 500° F. and the cool reinjection fluid temperature is assumed to be 179° F., then the mixture temperature will be halfway between these temperatures, or 339.5° F. On the other hand, if the hot production fluid temperature is assumed to be 500° F. and the cool reinjection fluid temperature is assumed to be 212° F. then the temperature of the mixture will be 356° F.

A test well observed by the applicants in the North Brawley region of the Imperial Valley in Southern California illustrates a typical example of a hot geothermal well which can be made into an efficient commercial producer of power by the present invention, but which would otherwise be noncommercial. This test well had a bottom hole temperature of 515° F., and when allowed to flow under the power of its own flashing steam produced approximately 250,000 pounds per hour of hot geothermal liquid and steam at a temperature substantially reduced from the bottom hole temperature. Within 30 days, allowing the well to continuously flow under the pressure of its flashing steam, the well became seriously plugged up, principally with carbonates, and possibly also with some silica. Without application of the method and apparatus of the present invention to this well, the well would be useless for production of electrical power.

The hot geothermal liquid produced by this North Brawley test well was a brine having a salt content of about 85,000 ppm (parts per million), consisting principally of sodium chloride and calcium chloride salts. It has been determined by the applicants that where the chloride salt content of a hot geothermal brine is below about 250,000 ppm, it is generally not too corrosive for use in presently available heat exchangers and can be passed directly through heat exchangers as in the heat transfer and generating means 60 of FIG. 1, provided that the silica content of the fluid is sufficiently low. For the purpose of the present example it will be assumed that the silica content of the North Brawley test well is within acceptable limits for use of the heat transfer and generating means of FIG. 1.

Applying the method and apparatus of the present invention to this North Brawley test well, if the rate of flow of the hot geothermal liquid from the well were just the 250,000 pounds per hour which would result from allowing the fluid to flow up under its own flashing steam, and if the same rate of flow were provided for the cool reinjection fluid from heat transfer and generating means 60, then the total rate of flow of the mixture from well discharge port 52 would be 500,000 pounds per hour. Assuming that an isobutane power fluid circuit were used in heat transfer and generating means 60, with a resulting reinjection fluid temperature of 179° F., the temperature of the fluid mixture would be the average between the 515° F. production fluid temperature and the 179° F. reinjection fluid temperature, or 347° F., which is close to the median temperature of 350° F. for the preferred temperature ranges set forth hereinabove.

The flash point for the fluid mixture temperature of 347° F. is approximately 129 psia, so as to assure against flashing the pressure control valve 58 may be set, for example, to provide a back pressure against the flow of pumped fluid of about 175 psia, or 160 psig.

The actual production rate of hot geothermal liquid from this North Brawley test well would be substantially greater than the 250,000 pounds per hour produced by allowing the fluid to flow up under the pressure of its own flashing steam, inasmuch as the large volume occupied in the well by the flashing steam substantially reduced the capacity of the well from that which could be achieved by prohibiting flashing in the well in accordance with the present invention. Based upon the experience of the applicants with wells of this general type, the applicants estimate that by prohibiting flashing in the well, the flow rate would be increased from 250,000 pounds per hour to about 400,000 pounds per hour. If the flow rate were thus increased by use of the invention to about 400,000 pounds per hour, and a like rate of flow were established for the reinjection fluid back into the primary well to produce an averaged temperature of 247° F. for the mixture, then the total flow rate for the geothermal fluid processed in the heat transfer and generating means would be about 800,000 pounds per hour, half of which would be continuously reinjected into the primary well.

The foregoing example of application of the method and apparatus of the present invention to the North Brawley test well thus illustrates some of the advantages of the invention, including (1) eliminating plugging so as to render an otherwise non-commercial well commercially practical, (2) providing a fluid output temperature for the well that is optimum for efficient power production, (3) conserving the heat of vaporization that would otherwise have been lost in flashing in the well, (4) greatly increasing the effective flow volume of the well, (5) returning much of the heat energy of the geothermal fluid that was used for the production of power, and that would otherwise have been wasted, back into the production well system, and (6) enabling the well to be controlled during stripping in of the pump.

Very hot geothermal resources involving conditions generally similar to those of the aforesaid North Brawley test well have also been found near Cerro Prieta, Mexico, and near La Baca, New Mexico, and also exist in El Salvador, Japan and Italy.

It is to be noted that the density of the 85,000 ppm brine produced by the said North Brawley test well is slightly greater than the density for pure water, being approximately 1.006 times the density of pure water, while the minimum estimated tail pipe lengths set forth in the chart hereinabove were determined on the basis of fluid columns having the density of pure water. Nevertheless, this is only about a 0.6% difference in the densities, which would result in only about a 0.6% difference in the minimum estimated tail pipe lengths from those set forth in the above chart. Thus, for example, if it were estimated according to the procedure used for the estimates in the chart that a 1,000 foot tail pipe would be required, then with the increased density of the brine of the North Brawley well, the revised estimate for the tail pipe length would be 994 feet, or only 6 feet shorter. Accordingly, as a practical matter the previously indicated procedure for estimating the desired length for the long tail pipe may still be used, despite variations in brine concentrations that will be encountered in various wells.

In the event that the silica content of the hot geothermal fluid produced by a well such as the aforesaid test well at North Brawley should prove to be too high for the practical utilization of heat exchangers for transferring the heat energy directly from the geothermal liquid to a power fluid as described in connection with the heat transfer and generating means 60 of FIG. 1, then the geothermal fluid mixture from the well may be flashed in steam separators, and the resulting steam passed through heat exchangers for heating the power fluid as described hereinafter in connection with FIG. 3, or the separated steam may be used to directly drive steam generators as described hereinafter in connection with FIG. 6.

Figure 2:
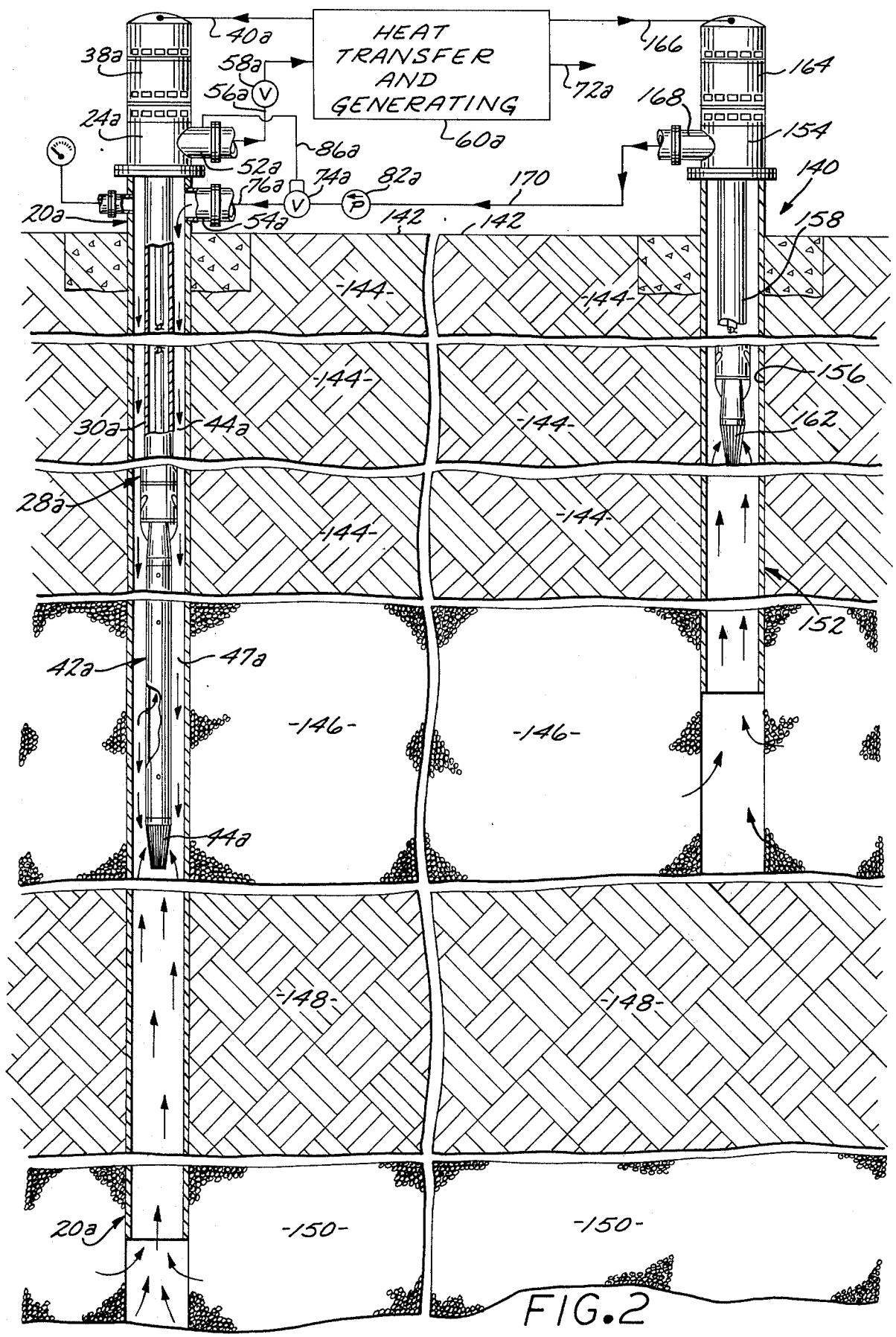
FIG. 2 is a diagrammatic view illustrating another form of the invention wherein the relatively cool injection liquid for controlling the high temperature geothermal well is provided from another, cooler geothermal source.

FIG. 2 of the drawings illustrates another type of system wherein a very hot geothermal well is controlled by the long tail pipe pumping method and apparatus of the present invention, but wherein the source of the cooler geothermal fluid which is injected into the hot well is from a separate, cooler geothermal well.

The applicants have determined from field experience that very often a geothermal field will include different production zones or sources which may differ widely from each other in temperature, and which may also have a great difference in the rate of fluid production. Typically, a geothermal field may include a deep production zone which is a source of very hot geothermal fluid, as for example geothermal fluid at a temperature above 500° F., but with a relatively low volume of flow available; while in the same geothermal field there will also be a shallower production zone which is a source of hot geothermal fluid that is much cooler, as for example fluid in a temperature range of from 280° to 300° F., but with a relatively high volume of flow available. In some instances the cooler geothermal well may be located in a fringe region of a very hot geothermal production field, with the cooler geothermal source located at either the same formation level as the hot source or at a different formation level. In such situations the high volume, low temperature geothermal fluid production zone may represent a tremendous source of geothermal energy, yet such source may be relatively uneconomical for the production of electrical power pursuant to conventional methods and apparatus due to the relatively low temperature of the source. On the other hand, the relatively low volume but very hot geothermal production zone may by itself be of only limited economic value even with the use of the long tail pipe pumping method of the present invention as described hereinabove in connection with FIG. 1, because of the relatively low flow volume available.

The system illustrated in FIG. 2 involves combining the flow from such a relatively low temperature geothermal fluid production zone with the flow from such a relatively high geothermal production zone in such a way that the temperature of the relatively cool geothermal fluid is raised to within a temperature range that is highly efficient for power production, while at the same time the very high temperature geothermal source is controlled against flashing and the high temperature fluid is cooled to within a temperature range that is highly efficient for power production, whereby the entire geothermal resource, including both the relatively low temperature source and the very high temperature source, is made available for the efficient production of electrical power.

In FIG. 2 a high temperature geothermal well 10a is shown at the left-hand side of the drawing and low temperature geothermal well 140 is shown at the right-hand side of the drawing. Both of the wells 10a and 140 extend down from the surface 142 of the ground through a first low permeability earth formation 144 to a first porous formation 146 which is a source of relatively low temperature geothermal fluid, the low temperature well 140 terminating in first porous formation 146 so as to provide access to this source of relatively low temperature geothermal fluid.

High temperature geothermal well 10a extends on down below first porous formation 146 through a second low permeability formation 148 into a second porous formation 150 which is a source of very hot geothermal fluid.

In a geothermal field where the sources of relatively low temperatuure geothermal fluid and relatively high temperature geothermal fluid are located in separate formations at different depths, the high temperature well 10a and low temperature well 140 may be located as close to each other as desired for convenience and economy in the above-ground equipment. On the other hand, if the relatively high and relatively low temperature geothermal fluid production zones were in laterally spaced regions of the same basic earth formation, then the high temperature and the low temperature wells would necessarily be required to be more widely spaced apart according to the lateral separation of the respective zones in the formation.

Referring to the high temperature geothermal well 10a, this well includes a casing 20a which is cemented in proximate the surface 142 and extends downwardly through the formations 144, 146 and 148 into the lower porous formation 150 to receive a flow of high temperature geothermal fluid from the porous formation 150. The apparatus of the high temperature geothermal 10a is the same as the apparatus of well 10 shown in FIG. 1, including a turbine pump 28a having water column 30a and driven by a motor 38a which receives power through conductor means 40a. Long tail pipe 42a is suspended below pump 28a, having perforated liner or strainer 44a attached to its lower end. Well discharge head structure 24a is supported at the upper end of casing 20a and is in communication with the water column 30a, the discharge head structure 24a including well discharge port 52a. An injection port 54a is connected to the exposed upper end portion of casing 20a so as to be in communication with the annulus 41a between the pumping column and the casing and the annulus 47a between the long tail pipe and the casing.

The geothermal fluid output of well 10a is provided from well discharge port 52a through fluid delivery conduit 56a having pressure control valve 58a therein to heat transfer and generating means 60a having output conduit means 72a which leads to a separate reinjection well such as the reinjection well 80 shown in FIG. 1. Heat transfer and generating means 60a may be of any desired type for efficient generation of electrical power at the temperature of the hot geothermal fluid provided from well 10a. Thus, the heat transfer and generating means 60a may be of the same type as heat transfer and generating means 60 shown in FIG. 1, wherein the thermal energy from the hot geothermal liquid is transferred in heat exchangers to a suitable power fluid such as isobutane for generating the power in a separate Rankine cycle system; or the hot geothermal liquid may, if desired, be flashed to steam with the steam either transferring the heat energy in heat exchangers to a power fluid for generating power as in FIG. 3 of the drawings, or the steam directly driving steam generators as in FIG. 6 of the drawings.

The low temperature geothermal well 140 includes a casing 152 which is cemented in proximate the surface 142 of the ground, with well discharge head structure 154 mounted on the upper end of the casing 152. A turbine pump 156 is suspended down in the well casing 152, and includes water column 158 which communicates at its upper end with the well discharge head structure 154. A perforated liner or strainer 162 is attached to the lower, input end of the pump 156. Pump 156 is driven by a motor 164 mounted on the discharge head structure 154, motor 164 receiving power through conductor means 166 from the heat transfer and generating means 60a, this also being the source of power for the motor 38a of well 10a provided through conductor means 40a.

The geothermal fluid output of the relatively low temperature well 140 is provided through well discharge port 168 on discharge head structure 154, this fluid output being provided through injection fluid conduit 170 to a temperature control valve 74a which passes the fluid at a controlled flow rate through a conduit 76a to the injection port 54a of the hot geothermal well 10a. Suitable injection pressure for this fluid that is furnished from low temperature well 140 to the injection port 54a of high temperature well 10a is assured by injection pressure pump 82a in conduit 170, and the rate of flow of this injection fluid for well 10a is automatically adjusted to establish a predetermined fluid output temperature at the discharge port 52a of well 10a by temperature sensing means in discharge port 52 which is connected to temperature control valve 74a by means of temperature sensing signal conductor means 86a.

While the temperature of the geothermal fluid source provided from formation 146 to the low temperature well 140 is sufficiently low so as to not require the use of the long tail pipe, it will nevertheless be sufficiently high to make pumping desirable so as to avoid flashing in the well. Thus, the pumping system shown and described in the aforesaid McCabe U.S. Pat. No. 3,757,516 is employed in the low temperature well 140. The pump 156 in low temperature well 140 is disposed sufficiently low in the well to avoid cavitation, but inasmuch as the temperature of the fluid provided to pump 156 in well 140 is substantially less than the fluid mixture temperature provided to the pump 28a in high temperature well 10a, the depth of pump 156 in low temperature well 140 will not have to be as great as the depth of the pump 28a in high temperature well 10a.

The injection fluid that is provided from low temperature well 140 to the injection port 54a of high temperature well 10a flows down in the high temperature well 10a through annuli 41a and 47a and is mixed with the very high temperature fluid coming up in well 10a from the formation 150, the mixture being provided through long tail pipe 42a to pump 28a and then being pumped upwardly through water column 30a and out through discharge port 52a and thence to the heat transfer and generating means 60a for generating electrical power. Aside from the fact that the injection fluid has been provided to the high temperature geothermal well 10a from the separate low temperature geothermal well 140, the high temperature well 10a operates in the same manner as the high temperature well 10 shown in FIG. 1 and described in detail in connection therewith.

Although the system of FIG. 2 may be employed for various relative temperatures and relative flow volumes between the high temperature well 10a and low temperature well 140, in the typical situation the temperature of the geothermal fluid source for the high temperature well 10a will be a great deal higher than the optimum temperature desired for the heat transfer and generating means 60a, and the high temperature well 10a will have a relatively low flow volume; while at the same time the temperature of the geothermal fluid source for the low temperature well 140 will only be slightly below the optimum temperature range for the heat transfer and generating means 60a, while the flow volume for the low temperature well 140 will be very large as compared with the flow volume for the high temperature well 10a. In this case it will be seen from the formula previously set forth relating flow volumes of the hot production fluid and of the injection fluid to temperature differences between the hot production fluid and mixture on the one hand and the mixture and cool injection fluid on the other hand, that the relatively large temperature difference between the temperature of the hot production fluid and the mixture temperature compensates for the relatively low flow volume of the hot production fluid on the one hand, while the relatively high flow volume of the low temperature well 140 compensates for the relatively small temperature difference between the fluid mixture temperature in well 10a and the temperature of the injection fluid provided by the low temperature well 140. Thus, in this typical situation there is a generally ideal match between the high temperature well 10a and the low temperature well 140 so that both wells may be operated at or near full flow capacity, while at the same time producing a fluid mixture temperature within the efficient power-producing range for the heat transfer and generating means 60a.

The formula relating the flow rates for the wells 10a and 140 of FIG. 2 to the temperature differences between the hot production fluid and fluid mixture on the one hand and the mixture and injection fluid on the other hand is as follows:

$$(F_c/F_h) = (T_h/T_c)$$

where:
$F_c$ = rate of flow of cool injection fluid from well 140
$F_h$ = rate of flow of hot production fluid in well 10a
$T_h$ = difference between the temperatures of the hot production fluid in well 10a and the fluid mixture
$T_c$ = difference between the temperatures of the fluid mixture and the cool injection fluid from well 140

With known temperatures T1 for the hot fluid and T2 for the cool fluid, and assuming the wells 140 and 10a are allowed to flow at their full capacity with a known flow ratio $(F_c/F_h) = F_r$, then the resulting mixture temperature $T_{mix}$ may be determined from the above formula as follows:

$$F_r = T_h/T_c = (T_1 - T_{mix})/T_{mix} - T_2)$$

Solving this equation for the mixture temperature, it will be seen that:

$$T_{mix} = (T_1 + T_2 F_r)/(1 + F_r)$$

By way of example, if the hot production fluid temperature $T_1$ is 520° F., the cool injection fluid temperature $T_2$ is 290F., and the rate of flow of the relatively cool well 140 at full capacity is three times that of the relatively hot well 10a so that $F_r = 3$, then the mixture temperature $T_{mix}$ will be:

$$T_{mix} = (520 + 290 \times 3)/(1 + 3) = 1,390/4 = 347.5° F.$$

As another example, for these same temperatures of the hot production fluid and cool injection fluid, if the rate of flow of the relatively cool well 140 were 5 times that of the relatively hot well 10a, then the temperature of the mixture would be 328° F. As a further example, for these same temperatures of the production and injection fluids, if the rate of flow of the cool injection well 140 were twice that of the hot production well 10a, then the fluid mixture temperature would be 367° F. It will be seen that for all three of these examples the fluid mixture temperature is within the presently preferred temperature range for the fluid mixture of from about 325° F. to about 375° F.

For applications of the present employing a plurality of wells pursuant to the system of FIG. 2 of the drawings, the temperature of the relatively cool injection fluid provided by the well 140 is preferably not higher than about 325° F., although it will in most applications not be higher than about 300° F. The temperature of the relatively hot production fluid provided by the well 10a in the system of FIG. 2 is preferably at least about 375° F., although it will in most applications be at least about 400° F.

Although the system of FIG. 2 has been shown and described in detail for only a single relatively hot geothermal well and a single relatively cool geothermal well, it is to be understood that the output flows from a plurality of relatively cool geothermal wells may be injected into a single relatively hot geothermal well, or alternatively that the output from a single relatively cool geothermal well may be injected into a plurality of relatively hot geothermal wells without departing from the invention as described in connection with FIG. 2. Further, if desired the combined outputs from a plurality of the relatively cool wells may be divided for injection into a plurality of the relatively hot wells within the scope of the invention.

The applicants have observed that in some geothermal fields which have sources of both relatively high and relatively low temperatures geothermal brines available for application of the form of the invention shown in FIG. 2, one of these sources may have a much lower mineral content than the other. This will result in a mineral content of the fluid mixture that is substantially lower than that of the high mineral content brine, making the mixture easier to work with and in some instances permitting the use of direct liquid-to-liquid heat exchangers where otherwise the fluid would have to be flashed to steam to make the heat energy of the fluid available for generating power. Typically, the higher mineral content will be in a high temperature, low volume source while the lower mineral content will be in a low temperature, high volume source, so that the mineral content of the mixture will be reduced to a surprising extent.

FIG. 3 of the drawings shows a modified form of the present invention which is generally similar to the form illustrated in FIG. 1, but which is particularly adapted to cope with situations where the very hot production fluid of the high temperature geothermal well is a brine that is too corrosive for direct application to heat exchangers, or has a high silica content that may tend to cause clogging of heat exchangers or of the reinjection system for returning the used, cooled fluid to the ground at a location spaced from the hot geothermal production well.

As indicated above, some hot goethermal brines may be too corrosive for direct passage thereof through presently available heat exchangers.

It has also been observed by the applicants that where the silica content of the hot geothermal fluid is too great, the substantial temperature drop to which the fluid is subjected as it passes through the heat exchangers may result in the precipitation and accumulation of undesirably large quantities of silica in the heat exchangers, and such precipitated silica is difficult and expensive to remove from heat exchangers of present construction. As a practical matter present heat exchangers can only handle hot geothermal liquid having up to about 350 ppm silica content.

These problems of the brine being too corrosive or having too high a silica content for liquid-to-liquid heat exchangers may be overcome by flashing the fluid to steam in steam separators of a type that can be easily cleaned out on a periodic basis, and then either passing the steam through heat exchangers to apply the heat energy to a power fluid such as isobutine for generating the power as illustrated in FIG. 3, or using the steam to directly drive steam generator means as illustrated in FIG. 6. If the separated steam contains a substantial amount of incondensable gas such as carbon dioxide, as for example on the order of 5 to 15% by volume which is common in some areas, then the steam can not be directly used in a condensing steam turbine, and it will be desirable to transfer the heat energy from the steam to a power fluid in heat exchangers as in the form of the invention shown in FIG. 3. The use of a separate power fluid generating cycle is also generally more efficient than direct steam generating where the temperature of a very hot well is brought down to within a temperature range of between about 300° and 400° F. by reinjection of a portion of the cooled, used geothermal fluid back into the hot well in accordance with the principles of the present invention, because a power fluid such as isobutane can be employed which is highly efficient and enables a relatively small, low cost turbine to be employed, whereas steam in this temperature range is relatively inefficient for direct generating, having a relatively low pressure and low heat rate, and requiring the use of a relatively large and expensive turbine.

FIG. 3 shows a high temperature geothermal well generally designated 10b, and the apparatus of the well 10b may be the same as the apparatus of well 10 shown in FIG. 1, including the turbine pump and long tail pipe suspended in the well. Well 10b includes casing 20b having discharge head structure 24b thereon, with motor 38b receiving power through conductor means 40b for driving the pump within the well. Discharge head 24b has discharge port 52b thereon, while the casing 20b has reinjection port 54b thereon. The geothermal fluid output of well 10b is provided from discharge port 52b through fluid delivery conduit 56b having pressure control valve 58b therein to heat transfer and generating means 60b.

In heat transfer and generating means 60b the hot geothermal fluid passes from fluid delivery conduit 56b through a series arrangement of steam separators 180 and 182, each of which has a flash control valve means 184 associated therewith. The steam separators 180 and 182 may be of any conventional type, as for example the New Zealand vortex type, which enables precipitated minerals to be easily removed, and although two of the steam separators are shown, it is to be understood that any desired number may be employed in sequence. Separated steam from the first steam separator 180 is conducted through steam conduit 186 to a first heat exchanger 188 wherein heat energy from the steam is transferred to a power fluid. Similarly, separated steam from the second steam separator 182 is conducted through steam conduit 190 to a second heat exchanger 192 for transferring heat energy from the steam to the power fluid. Although the used steam is shown as being simply vented to the atmosphere from heat exchangers 188 and 192, it is to be understood that if desired it may be condensed and recombined with the reinjection fluid output from the second steam separator 182.

Only about 20% or less of the hot geothermal fluid will be separated into steam in the steam separators 180 and 182, and the remaining geothermal fluid will then pass from the steam separator 182 through an output conduit 72b having a reinjection fluid pressure pump 82b therein to a temperature control valve 74b which returns a portion of the fluid through a conduit 76b to the reinjection port 54b of well 10b for mixing with the hot production fluid in well 10b so as to control the temperature of the well output at its discharge port 52b. Temperature control valve 74b directs the remaining portion of the reinjection fluid through an output conduit 78b to a separate reinjection well 80b having injection pump 196 associated therewith, the reinjection fluid passing through mineral separation channel means 194 described in detail hereinafter.

Referring now to the closed power fluid circuit of heat transfer and generating means 60b, the power fluid passes from heat exchanger 188 through K.O. tank 90b to power turbine 94b which drives electric power generator 96b, a small portion of the output from generator 96b being delivered through transformer means 100b to conductor means 40b for driving the geothermal well pump motor 38b. The power fluid passes from turbine 94b through condenser means 104b where it is liquified to power fluid receiver 118b, from which the power fluid is pressurized and delivered by pump means 114b to the heat exchanger 192 and thence to the heat exchanger 188. The waste heat that is extracted from the power fluid in condenser means 104b is rejected in a cooling tower 128b.

Where a portion of the geothermal fluid output from the high temperature geothermal well has been flashed off into steam for generating the power, as in the system of FIG. 3, the remaining geothermal fluid will have an increased mineral concentration which may interfere with the reinjection thereof back into the ground and may undesirably alter the mineral balance in the underground geothermal fluid source if conventional reinjection methods and apparatus were employed.

If the usual reinjection pipeline were to be employed for conducting this more concentrated geothermal fluid back to a reinjection well, the precipitation out of minerals, including but not limited to silica and carbonates, from the fluid as it cools off in the pipeline will rapidly tend to clog the pipeline. Also, with conventional reinjection pipeline, there is a substantial corrosion problem from the increased concentration of brine salts in the reinjection fluid, and also from an increased oxygen content in the fluid if the system is not kept completely closed.

Similar problems are caused by the increased mineral content of the reinjection fluid in the region of the reinjection well. Thus, precipitation of minerals from the reinjection fluid tends to clog the reinjection well, and precipitated silica is a particularly troublesome problem inasmuch as it precipitates out as sand which not only can clog the reinjection well but can damage the reinjection pump. Precipitating minerals from the concentrated reinjection brine not only tend to clog the pipeline and the reinjection well, but they also tend to reduce the permeability of the earth formation in the reinjection zone, thereby making reinjection more difficult even if the pipeline and well are cleaned out.

Mineral contamination of the primary well would also be likely to result from returning a reinjection fluid back to the aquifer which has a higher percentage mineral concentration than the geothermal production fluid from the primary well. Thus, the increased mineral concentration of the reinjection fluid tends to raise the overall mineral concentration of the source of geothermal fluid for the producing well, thereby tending to make the mineral problem at the producing well a more difficult one to cope with.

Thermal contamination at the producing well is also a problem which must be considered in reinjecting the used, cool fluid back into the aquifer. If the reinjection well is placed close to the producing well, the flow of cool reinjection fluid back into the producing formation can substantially reduce the temperature of the production fluid, thereby lowering the overall thermal efficiency of the system. Accordingly, it is preferred to place the reinjection well at a substantial distance from the producing well so as to provide an extended flow path and residency time for the reinjection fluid to be reheated in the producing formation before arriving back in the region of the primary well. However, if conventional reinjection practice is employed, such substantial spacing of the reinjection well from the producing well will require the use of a very long reinjection pipeline, thereby complicating the pipeline problems referred to above.

The mineral separation channel means illustrated in FIGS. 3, 4 and 5 provides a simple and economical solution to all of the aforesaid reinjection problems by providing an extended open channel from the region of the primary production well to the region of the reinjection well for the controlled precipitation of a substantial portion of the minerals contained in the concentrated reinjection fluid, while at the same time providing for the desired wide separation of the reinjection well from the production well. Referring to FIGS. 3 to 5, the mineral separation channel means includes a long concrete ditch generally designated 200 having a generally horizontal bottom wall 202 and a pair of inclined side walls 204. The ditch will be inclined from its front end proximate the production well 10b to its rear end proximate the reinjection well 80b to provide for substantially uniform flow of the reinjection fluid through the open ditch 200. The cross-sectional area of the ditch and rate of incline along the length of the ditch are arranged to allow a substantial residency time of the geothermal fluid in the ditch so that substantial cooling of the reinjection fluid will occur generally along the entire length of the ditch, with consequent precipitation of minerals from the concentrated fluid along substantially the entire length of the ditch. Although the cross-sectional size of the ditch 200 will vary according to the rate of flow of geothermal fluid from the well 10b, by way of example only and not of limitation the concrete ditch 200 may have a depth on the order of 3½ feet, a width at bottom wall 202 on the order of 3 feet, and a width at the open top on the order of 4 feet.

The concrete ditch 200 is preferably at least one-half mile long, and for most applications it will be at least 1 mile long and up to 2 or more miles in length. It is preferred that the ditch 200 be straight so as to cooperate in the system for maximum separation between the production well 10b and the reinjection well 80b, although it is to be understood that the ditch 200 may, if desired, be curved to accommodate contours in the land, or to provide greater length for the ditch than the separation distance between the primary and reinjection wells.

The long concrete ditch 200 has an entrance spillway 206 at its front end into which the reinjection fluid is deposited from temperature control valve 74b and its output conduit 78b. Inasmuch as there will be some drop in pressure as the fluid is ejected from conduit 78b into spillway 206, there may be a substantial amount of mineral separation in this region, so that it may be desirable to provide a spillway 206 having substantial area, or it may even be desirable to utilize a cooling pond in place of the spillway 206.

A series of mineral traps 208 in the form of ribs extending up from bottom wall 202 across the width of the ditch are disposed at spaced intervals along the length of the ditch 200 so as to catch the minerals that are precipitated out from the fluid as the fluid passes along the length of ditch 200. Each of the traps 208 is located in a widened zone 210 of ditch 200 which provides at least as much cross-sectional flow area proximate each trap 208 as in the portions of ditch 200 between the traps. The series of traps 208 at spaced intervals along the ditch provides a number of pockets having a total volume that is substantial for the accumulation of precipitated minerals, and these open pockets are easily accessible for the periodic removal of accumulated minerals therefrom.

The reinjection fluid is deposited from the rear end of ditch 200 into a sump 212, which may be a cooling pond, and is picked up by reinjection pump 196 from a skimmer 214 associated with sump 212 and then reinjected through the reinjection well 80b. Some additional mineral separation may occur in the sump 212.

It will be seen that the open concrete ditch 200 completely avoids clogging and corrosion problems associated with conventional reinjection pipelines, and disposes the precipitated minerals at positions where they are readily accessible for removal. Precipitation of some of the minerals out of the reinjection fluid in the ditch also avoids undesirable precipitation in the region of the reinjection well, avoiding any problem of entrained sand from silica precipitation in the reinjection well pump, avoiding clogging of the reinjection well, and also avoiding the problem of reduced permeability of the earth formation in the reinjection zone.

The precipitation of minerals from the reinjection fluid in the concrete ditch will reduce the percentage mineral concentration in the reinjection fluid sufficiently so that the returning flow of reinjection fluid into the production formation will not tend to raise the mineral concentration of the hot geothermal fluid at the production well. The mineral concentration of the production fluid may even be slightly lowered by the reduced mineral concentration in the reinjection fluid, thereby reducing the problem of coping with minerals at the production well.

The concrete mineral separation ditch permits as much separation as desired between the production well and the reinjection well to completely avoid thermal contamination of the production well, yet this is done without the usual problems and expense associated with conventional reinjection pipelines.

Another surprising advantage of the long concrete mineral separation channel of the present invention is that the exposure of the reinjection fluid to evaporation and to the cooler environment for a long residency time in the channel provides a considerably greater amount of cooling of the reinjection fluid than would occur in a conventional reinjection pipeline, and the cooler reinjection fluid provides a greater hydrostatic reinjection head which will avoid cavitation in the reinjection pump and somewhat reduce the reinjection pumping load. The concrete ditch mineral separation channel enables the reinjection fluid to be moved as slowly as desired, according to the crossectional dimension of the channel and the incline thereof, so as to produce the desired amount of cooling and settling effect for the minerals. In general, the fluid will flow substantially slower through the concrete ditch than it would through a conventional reinjection pipeline, with less heat-producing friction than would be present in a pipeline.

Although the mineral separation channel means of the present invention has been shown and described in connection with the high temperature geothermal well 10b having the long tail pipe reinjection means and associated pumping means therein, and in connection with the heat transfer and generating means 60b wherein separated steam from the geothermal fluid is passed through heat exchangers; it is to be understood that the mineral separation channel means illustrated in FIGS. 3 to 5 and described in detail hereinabove is also useful for reducing the mineral content and temperature of the reinjection fluid in other geothermal power systems. For example, the long concrete ditch mineral separation channel means may also be employed in connection with the systems of the said McCabe U.S. Pat. No. 3,757,516 and of FIG. 1 of the present application wherein the hot geothermal fluid is passed through heat exchangers without flashing; for the system of FIG. 2 in the present application wherein the long tail pipe pumping system of the very hot producing well is provided with injection fluid from a separate, cooler well, regardless of the type of heat transfer and generating means that is employed; or for the system shown in FIG. 6 wherein flashed steam from the hot geothermal fluid directly drives steam turbine generating means.

In some areas such as the Niland area of the Imperial Valley in California, very high temperature brines having high mineral concentrations are found so close to the surface of the ground as to make pumping in the well undesirable. For example, a test well drilled by the applicants in the Niland area had a bottom hole temperature of 509° F., and produced a brine having a high silica content, and a chloride salt content on the order of 170,000 ppm, with approximately 6% carbon dioxide. While the comparative shallowness of this well may make pumping undesirable, it would nevertheless enable the hot fluid to be produced sufficiently economically for power generation by allowing it to flow up under the power of its own flashing steam. The high silica content is typical for high temperature geothermal brines and is difficult to handle in present heat exchangers, so that the thermal energy for power generation would be obtained by flashing steam from the fluid; and because of the high carbon dioxide content, this flashed steam would then be passed through heat exchangers to provide the energy to a power fluid in a heat transfer and generating system similar to that shown in FIG. 3, rather than using the steam for direct power generation in steam turbines. Approximately 20% of the fluid would thus be flashed off into steam for use in the heat exchangers, and this would then materially increase the percent mineral content, including but not limited to silica and carbonates, in the fluid required to be reinjected into the aquifer. Further, since the silica carrying capacity of the fluid is directly proportional to its temperature, substantial amounts of silica will be precipitated out as the fluid cools in the reinjection system. However, the long concrete ditch mineral separation channel means of the present invention may be employed in connection with such a power generating system to reduce the high silica and other mineral content of the output fluid so that it can be satisfactorily reinjected into the aquifer without clogging of the reinjection well or its proximate earth formations, and without contaminating the geothermal resource.

FIG. 6 illustrates a power generating system particularly adapted for use where the silica and/or chloride mineral content of the hot brine may be too concentrated for the use of heat exchangers so that steam separation is desirable, but where the carbon dioxide content is sufficiently low so that the separated steam can be used to directly drive a condensing steam turbine.

The system of FIG. 6 may employ a high temperature geothermal well 10c of the same type as well 10b in FIG. 3 and well 10 in FIG. 1. Well 10c includes casing 20c having discharge head 24c thereon. The pumping means within the well is driven by pump motor 38c on discharge head 24c, the motor being provided with electrical power through conductor means 40c. Well discharge port 52c is provided on the discharge head 24c, and reinjection port 54c is provided on casing 20c. The hot geothermal fluid output from discharge port 52c is conducted through delivery conduit 56c having pressure control valve 58c therein to heat transfer and generating means 60c, the hot fluid from delivery conduit 56c passing through a series of steam separators 220 and 222, each of which has flash control valve means 224 associated therewith. The remaining geothermal liquid then passes from steam separator 222 through output conduit 72c and reinjection fluid pressure pump 82c to temperature control valve means 74c which divides the reinjection fluid between temperature control fluid conduit 76c leading to the reinjection port 54c of well 10c on the one hand, and reinjection conduit 78c which delivers the remainder of the reinjection fluid to a separate reinjection well on the other hand.

Steam from the first steam separator 220 is delivered through steam conduit 226 to a relatively high pressure condensing steam turbine 228, while steam from the second steam separator 222 is delivered through steam conduit 230 to a relatively low pressure condensing steam turbine 232, the steam turbines 228 and 232 being suitably coupled by synchronizer means 234. The exhaust from condensing turbines 228 and 232 is distilled water, which may be collected in a conduit 236 as a valuable byproduct of the system.

Turbines 228 and 232 drive electric power generator means 94c, and a small portion of the power output therefrom is provided through transformer means 100c to the conductor means 40c for driving the well pump motor 38c.

While the invention has been particularly shown and described with reference to preferred embodiments thereof, it will be understood by those skilled in the art that various changes in form and details may be made therein without departing from the spirit and scope of the invention.

We claim:

1. The method of obtaining energy from a well which provides access to an underground source of high temperature geothermal liquid, comprising the steps of:
   introducing cooler liquid into said well,
   establishing a column of said cooler liquid in the well above said high temperature liquid of sufficient height to prevent flashing of said high temperature liquid into vapor,
   mixing said cooler liquid with said high temperature liquid in the well to produce a mixture having a temperature intermediate the temperatures of said high temperature liquid and said cooler liquid, and conducting a stream of said mixture from the well.

2. The method of claim 1, wherein said mixing step is performed along at least a substantial portion of the length of said column.

3. The method of claim 2, wherein said mixing step is substantially uniformly applied along a substantial portion of the length of said column.

4. The method of claim 1, wherein said column is defined in a generally tubular form.

5. The method of claim 4, wherein said mixing step is performed at least partly in the center of said generally tubular column.

6. The method of claim 4, wherein said stream of said mixture is conducted through the center of said generally tubular column.

7. The method of claim 1, which comprises the further step of restraining said mixture against flashing in the well.

8. The method of claim 7, wherein said mixture is restrained against flashing by pressurization thereof in the well.

9. The method of claim 8, wherein said pressurization is accomplished by pumping said mixture in the well.

10. The method of claim 1, wherein the temperature of said high temperature liquid is at least about 375° F.

11. The method of claim 1, wherein the temperature of said mixture is within a range of from about 300° to about 400° F.

12. The method of claim 1, wherein the temperature of said mixture is within a range of from about 325° to about 375° F.

13. The method of claim 1, which comprises the further step of sensing the temperature of said mixture conducted from the well, and controlling the amount of said cooler liquid that is introduced into the well in response to said sensed temperature so as to adjust the temperature of said mixture to a predetermined temperature.

14. The method of claim 1, wherein heat energy from said stream of said mixture that is conducted from the well is used for generating electrical power.

15. The method of claim 1, which comprises the further steps of transferring heat energy from said mixture to a power fluid after said stream thereof has been conducted from the well, and expanding said power fluid in a power extracting gas expansion device.

16. The method of claim 1, which comprises the further step of flashing a portion of said mixture into vapor after said mixture has been conducted from the well.

17. The method of claim 16, which comprises the further step of expanding said vapor in a power extracting gas expansion device.

18. The method of claim 17, which comprises the further steps of transferring heat energy from said vapor to a power fluid, and expanding said power fluid in a power extracting gas expansion device.

19. The method of claim 1, which comprises the further steps of removing heat energy from said mixture after said stream thereof has been conducted from the well thereby cooling the mixture, and utilizing a portion of said cooled mixture as said cooler liquid that is introduced into the well.

20. The method of claim 19, which comprises the additional steps of sensing the temperature of said mixture before it has been cooled, and controlling the proportion of said cooled mixture that is introduced as said cooler liquid into the well in response to said sensed temperature so as to adjust the temperature of said mixture to a predetermined temperature.

21. The method of claim 20, wherein the temperature of said mixture is adjusted to within a range of from about 300° to about 400° F.

22. The method of claim 20, wherein the temperature of said mixture is adjusted to within a range of from about 325° to about 375° F.

23. The method of claim 19, wherein said heat energy that is removed from said mixture is used for generating electrical power.

24. The method of claim 19, which comprises the further step of conducting the remainder of said cooled mixture back into the underground geothermal system from which it was derived.

25. The method of claim 1, which comprises the further step of providing said cooler liquid from a separate geothermal well.

26. The method of claim 25, which comprises the additional steps of sensing the temperature of said mixture conducted from the well, and controlling the amount of said cooler liquid that is provided from said separate geothermal well in response to said sensed temperature so as to adjust the temperature of said mixture to a predetermined temperature.

27. The method of claim 26, wherein the temperature of said mixture is adjusted to within a range of from about 300° to about 400° F.

28. The method of claim 26, wherein the temperature of said mixture is adjusted to within a range of from about 325° to about 375° F.

29. The method of claim 25, wherein the temperature difference between said high temperature liquid and said mixture is substantially greater than the temperature difference between said mixture and said cooler liquid from said separate geothermal well.

30. The method of claim 29, wherein the rate of flow of said cooler liquid provided from said separate geothermal well is substantially greater than the rate of flow of said high temperature liquid provided from said source thereof.

31. The method of claim 25, wherein said separate geothermal well provides said cooler liquid from an underground source located in the same geothermal field as said underground source of said high temperature liquid.

32. The method of claim 31, wherein said source of high temperature liquid is located at a substantially greater depth in the ground than said source of cooler liquid.

33. The method of claim 31, wherein said source of cooler liquid is at a location substantially laterally spaced from said source of high temperature liquid.

34. The method of claim 25, wherein the temperature of said cooler liquid provided by said separate geothermal well is not higher than about 325° F.

35. The method of claim 25, wherein the temperature of said cooler liquid provided by said separate geothermal well is not higher than about 300° F.

36. The method of claim 25, wherein said separate geothermal well provides said cooler liquid from an underground source having a temperature above the flash point for atmospheric pressure, and said cooler liquid is restrained from flashing in said separate geothermal well.

37. The method of claim 36, wherein said cooler liquid is restrained from flashing by pressurization thereof in said separate geothermal well.

38. The method of claim 37, wherein said pressurization is accomplished by pumping said cooler liquid in said separate geothermal well.

39. The method of claim 25, wherein heat energy from said stream of said mixture that is conducted from the high temperature well is used for generating electrical power.

40. The method of controlling a well which provides access to an underground source of high temperature geothermal liquid comprising the steps of:
   introducing a cooler liquid into the well, and
   establishing a column of said cooler liquid in the well above said high temperature liquid of sufficient height to prevent flashing of said high temperature liquid.

41. The method of claim 40, which comprises the further step of mixing said cooler liquid with said high temperature liquid to produce a liquid mixture that is substantially cooler than said high temperature liquid.

42. The method of claim 41, which comprises the additional step of restraining said liquid mixture against flashing in the well.

43. The method of claim 42, wherein said liquid mixture is restrained against flashing by pressurization thereof in the well.

44. The method of claim 43, wherein said pressurization is accomplished by pumping said liquid mixture in the well.

45. The method of claim 40, wherein the temperature of said geothermal source is at least about 375° F.

46. The method of claim 40, wherein the temperature of said cooler liquid is not higher than about 325° F.

47. The method of claim 40, wherein the temperature of said fluid mixture is within a range of from about 300° to about 400° F.

48. The method of controlling a well which provides access to an underground source of high temperature geothermal liquid comprising the steps of:
   introducing pump means into the well which has output conduit means thereabove in communication with the surface of the ground,
   leading said pump means into the well with a long tailpipe suspended below the pump means, and
   flowing cold liquid down into the well from the surface through said output conduit means, pump means and tailpipe while the tailpipe and pump means are being introduced into the well.

49. The method of claim 48, which comprises the further steps of flowing cold liquid down into the well about the outside of said output conduit means, pump means and tailpipe, and initiating operation of said pump means for pumping liquid upwardly through said output conduit means to the surface.

50. The method of controlling a well which provides access to an underground source of high temperature geothermal liquid, comprising the steps of:
   disposing pump means in the well having output conduit means thereabove in communication with the surface of the ground and having a long tailpipe suspended therebelow,
   continuously flowing a column of liquid that is substantially cooler than said high temperature liquid down into the well about the outside of said output conduit means, pump means and tailpipe,
   mixing said cooler liquid with said high temperature liquid in the well proximate said tailpipe to produce a mixture having a temperature intermediate the temperatures of said high temperature liquid and said cooler liquid, and
   pumping said mixture upwardly through said output conduit means to the surface.

51. The method of claim 50, wherein at least part of said mixing step is performed along at least a portion of the length of the tailpipe through a series of diffusion ports extending through the wall of the tailpipe at spaced intervals along at least a portion of the length of the tailpipe.

52. The method of claim 51, wherein said mixing step is appled along substantially the entire length of the tailpipe.

53. The method of claim 51, wherein said mixing step is substantially uniformly applied along the length of the tailpipe.

54. The method of claim 50, wherein said long tailpipe is sufficiently long so that the weight of the coextensive portion of said liquid column will exert a downward pressure on said source which, when added to the pressure in said column proximate the upper end of the tailpipe, will be sufficient to prevent flashing of said high temperature liquid.

55. The method of claim 54, wherein said mixture is pressurized by said pump means to a pressure greater than the saturated vapor pressure of said mixture.

56. The method of claim 55, wherein said pump means is located at a sufficient depth in the well so that said mixture received by the pump means will be at a pressure greater than its saturated vapor pressure.

57. The method of claim 54, which comprises the further step of estimating the length for said tailpipe by calculating the length of the coextensive portion of said liquid column that would exert a downward pressure on said source approximately equal to the difference between the saturated vapor pressures of said high temperature liquid and said mixture.

58. A system for generating electrical power from geothermal energy, which comprises:
   a well providing access to an underground source of high temperature geothermal liquid,
   pump means in said well having output conduit means thereabove in communication with power apparatus located proximate the surface of the ground, said power apparatus being adapted to convert thermal energy from hot liquid into electrical power,
   a long tailpipe suspended below said pump means in said well,
   a source of injection liquid that is substantially cooler than said high temperature liquid, and
   means for injecting said injection liquid into said well to the outside of said output conduit means to provide a continuously downflowing column of said injection liquid about the outside of said conduit means, pump means and tailpipe, said injection liquid mixing with said high temperature liquid proximate said tailpipe to produce a mixture having a temperature intermediate the temperatures of said high temperature liquid and said injection liquid, said mixture being pumped upwardly by said pump means through said conduit means to said power apparatus.

59. A system as defined in claim 58, wherein said long tailpipe has a series of diffusion ports extending through the wall thereof at spaced intervals along at least a portion of the length thereof so as to distribute said mixing along at least a portion of the length of said tailpipe.

60. A system as defined in claim 59, wherein said diffusion ports are provided along substantially the entire length of said tailpipe.

61. A system as defined in claim 58, wherein said long tailpipe is sufficiently long so that the weight of the coextensive portion of said liquid column will exert a downward pressure on said high temperature source which, when added to the pressure in said column proximate the upper end of said tailpipe, will be sufficient to prevent flashing of said high temperature liquid.

62. A system as defined in claim 61, wherein said pump means is adapted to pressurize said mixture to a pressure greater than the saturated vapor pressure of said mixture.

63. A system as defined in claim 62, wherein said pump means is located at a sufficient depth in said well so that said mixture received by said pump means will be at a pressure greater than its saturated vapor pressure.

64. A system as defined in claim 58, wherein said injection means comprises injection pump means.

65. A system as defined in claim 58, wherein the temperature of said high temperature liquid is at least about 375° F.

66. A system as defined in claim 58, wherein the temperature of said mixture is within a range of from about 300° to about 400° F.

67. A system as defined in claim 58, wherein the temperature of said mixture is within a range of from about 325° to about 375° F.

68. A system as defined in claim 58, which further comprises:
valve means associated with said injecting means for controlling the rate of flow of said injection liquid into said well, and
temperature sensing means associated with said output conduit means for sensing the temperature of said mixture, said temperature sensing means being operatively connected to said valve means for adjusting the rate of flow of said injection liquid in response to the temperature of said mixture so as to adjust the temperature of said mixture to a predetermined temperature.

69. A system as defined in claim 58, wherein said power apparatus comprises electric generator means, heat engine means drivingly connected to said generator means, and heat transfer means thermally connecting said output conduit means to said heat engine means so as to deliver thermal energy from said mixture to said heat engine means.

70. A system as defined in claim 69, wherein said heat engine means comprises closed power fluid circuit means.

71. A system as defined in claim 70, wherein said heat transfer means comprises heat exchanger means connected to said output conduit means and to said power fluid circuit means.

72. A system as defined in claim 70, wherein said heat transfer means comprises steam separator means connected to said output conduit means for separating steam from said mixture, and heat exchanger means connected to said steam separator means and to said power fluid circuit means.

73. A system as defined in claim 70, wherein the power fluid contained in said closed power fluid circuit means is isobutane.

74. A system as defined in claim 69, wherein said heat engine means comprises steam turbine means; and said heat transfer means comprises steam separator means connected to said output conduit means for separating steam from said mixture, and steam conduit means between said steam separator means and said steam turbine means.

75. A system as defined in claim 58, wherein said source of injection liquid comprises cooled mixture output means from said power apparatus for outflow of said mixture after heat energy has been removed from said mixture thereby cooling said mixture, and
cooled mixture passage means from said output means to said injecting means adapted to deliver a portion of the cooled mixture to said injecting means for return to said well.

76. A system as defined in claim 75, which further comprises:
valve means associated with one of said cooled mixture means for controlling the rate of flow of said cooled mixture back to said well through said injecting means, and
temperature sensing means associated with said output conduit means for sensing the temperature of the hot mixture from said well, said temperature sensing means being operatively connected to said valve means for adjusting the rate of flow of said cooled mixture in response to the temperature of said hot mixture so as to adjust the temperature of said hot mixture to a predetermined temperature.

77. A system as defined in claim 75, which includes injection well means spaced from said high temperature well, and return conduit means connected to one of said cooled mixture means and to said injection well means for returning the remainder of said cooled mixture back into the underground geothermal system from which it was derived.

78. A system as defined in claim 58, wherein said source of injection liquid comprises a separate geothermal well having an output connected to said injection means.

79. A system as defined in claim 78, which further comprises:
valve means associated with said connection between said separate well and said injecting means, and
temperature sensing means associated with said output conduit means for sensing the temperature of said mixture, said temperature sensing means being operatively connected to said valve means for adjusting the rate of flow of said injection liquid in response to the temperature of said mixture so as to adjust the temperature of said mixture to a predetermined temperature.

80. A system as defined in claim 78, wherein the temperature difference between said high temperature liquid and said mixture is substantially greater than the temperature difference between said mixture and said cooler liquid from said separate geothermal well, and
the rate of flow of said cooler liquid provided from said separate goethermal well to said injecting means is substantially greater than the rate of flow of said high temperature liquid provided from said source thereof.

81. A system as defined in claim 78, wherein said separate geothermal well provides said cooler liquid from an underground source located in the same geothermal field as said underground source of said high temperature liquid.

82. A system as defined in claim 81, wherein said source of high temperature liquid is located at a substantially greater depth in the ground than said source of cooler liquid.

83. A system as defined in claim 81, wherein said source of cooler liquid is at a location substantially laterally spaced from said source of high temperature liquid.

84. A system as defined in claim 78, wherein said separate geothermal well provides said cooler liquid from an underground source having a temperature above the flash point for atmospheric pressure, and
   means in said separate geothermal well for pressurizing said cooler liquid to a pressure greater than the saturated vapor pressure of said cooler liquid.

85. A system as defined in claim 84, wherein said pressurizing means comprises pump means.

86. A system as defined in claim 78, wherein the temperature of said cooler liquid provided by said separate geothermal well is not higher than about 325° F.

87. A system as defined in claim 78, wherein the temperature of said cooler liquid provided by said separate geothermal well is not higher than about 300° F.

88. A system as defined in claim 58, wherein said mixture is a brine having substantial mineral content, said system further comprising
   used mixture output means from said power apparatus for outflow of the used mixture after heat energy has been extracted therefrom,
   injection well means spaced from said high temperature well, and
   return conduit means from said mixture output means to said injection well means for returning said used mixture back into the underground geothermal system,
   said return conduit means comprising a long, open ditch proximate the surface of the ground, said ditch exposing a substantial surface area of said used mixture to the atmosphere for lowering the temperature of said used mixture as it flows through said ditch so as to cause precipitation of minerals out of said used mixture and thereby reduce the mineral content of said mixture.

89. A system as defined in claim 88, wherein said ditch is a concrete ditch.

90. A system as defined in claim 88, wherein said power apparatus includes means for flashing steam from said mixture whereby the mineral concentration of said used mixture is greater than that of the mixture provided to said power apparatus from said high temperature well.

* * * * *